US011070692B2

(12) United States Patent
Kawatsu

(10) Patent No.: US 11,070,692 B2
(45) Date of Patent: Jul. 20, 2021

(54) POST-PROCESSING APPARATUS AND IMAGE FORMING SYSTEM

(71) Applicant: KONICA MINOLTA, INC., Tokyo (JP)

(72) Inventor: Kenji Kawatsu, Kodaira (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

(21) Appl. No.: 17/009,229

(22) Filed: Sep. 1, 2020

(65) Prior Publication Data

US 2021/0099595 A1  Apr. 1, 2021

(30) Foreign Application Priority Data

Sep. 30, 2019 (JP) .............................. JP2019-180021

(51) Int. Cl.
H04N 1/40 (2006.01)
H04N 1/00 (2006.01)

(52) U.S. Cl.
CPC ....... H04N 1/00649 (2013.01); H04N 1/0066 (2013.01)

(58) Field of Classification Search
CPC ............. H04N 1/00649; H04N 1/0066; H04N 1/00718; H04N 1/00676; H04N 1/00679; H04N 1/00745
See application file for complete search history.

(56) References Cited

U.S. PATENT DOCUMENTS

| 2010/0110506 | A1* | 5/2010 | Katou | H04N 1/00694 358/488 |
| 2011/0200341 | A1* | 8/2011 | Moriya | B65H 9/002 399/16 |
| 2012/0153565 | A1* | 6/2012 | Deno | B65H 9/06 271/226 |
| 2012/0267846 | A1* | 10/2012 | Nakada | B65H 7/08 271/225 |
| 2019/0079445 | A1* | 3/2019 | Wakabayashi | G03G 15/6567 |

FOREIGN PATENT DOCUMENTS

JP  2019048692 A  3/2019

* cited by examiner

Primary Examiner — Moustapha Diaby
(74) Attorney, Agent, or Firm — Holtz, Holtz & Volek PC

(57) ABSTRACT

A post-processing apparatus includes a cutting device, one or both of an inclination detector and a side-edge detector, an inclination corrector and a hardware processor. The cutting device cuts a sheet along one or both of a feed direction in which the sheet is conveyed and a cross direction perpendicular to the feed direction. The inclination detector detects a front edge of the sheet in the feed direction at multiple positions in the cross direction. The side-edge detector detects a position of a side edge of the sheet in the cross direction. The inclination corrector performs an inclination correction operation of correcting an inclination of the sheet. The hardware processor causes the cutting device to cut the sheet after causing the inclination corrector to perform the inclination correction operation for an amount of the inclination based on the detection by the inclination detector or the detection by the side-edge detector.

12 Claims, 14 Drawing Sheets

FOUR-SIDE CUTTING

MULTIPLE CUTTING: CUT A4 INTO TWO PIECES

MULTIPLE CUTTING FOR CARDS

MULTIPLE CUTTING FOR BUSINESS CARDS

FIG.20
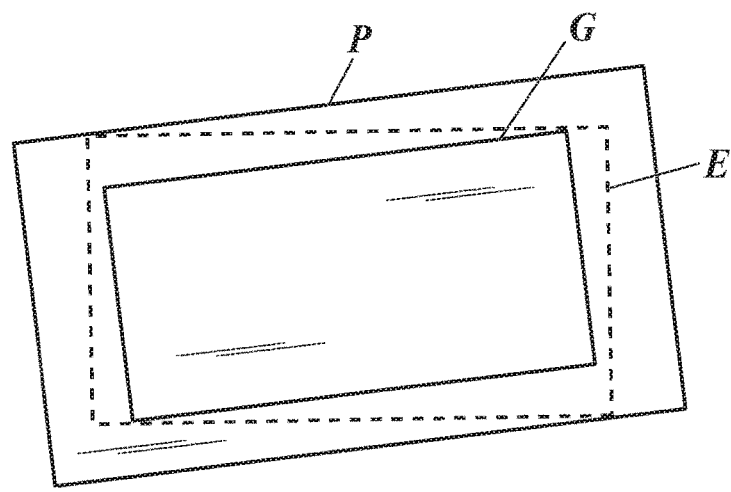
FIG.21
| | INCLINATION OF SHEET | TARGETED AMOUNT OF ROTATION | ACTUAL AMOUNT OF ROTATION | DIFFERENCE |
|---|---|---|---|---|
| FIRST ROUND | 5° | 5° | 4.5° | 4.5 / 5 |
| SECOND ROUND | 0.5° | 0.5 × 5 / 4.5 | 0.5° | 0 |
FIG.22
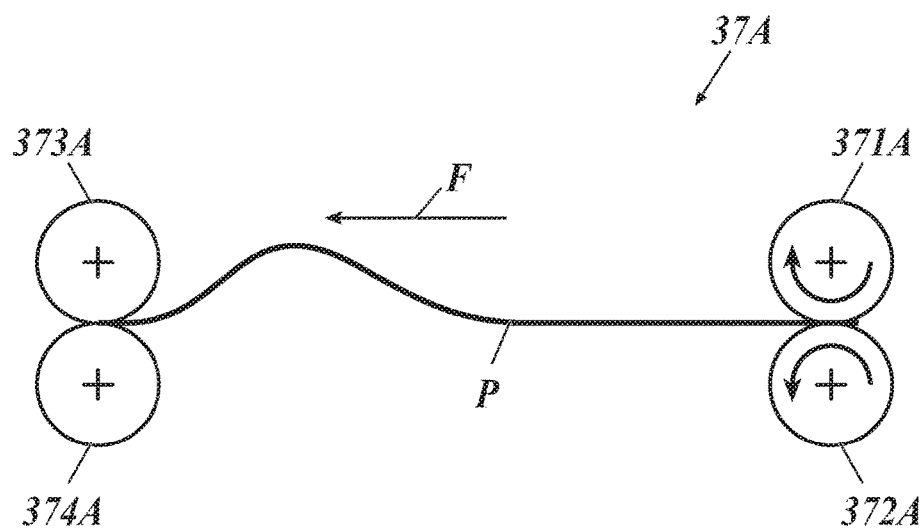

POST-PROCESSING APPARATUS AND IMAGE FORMING SYSTEM

CROSS-REFERENCE TO RELATED APPLICATIONS

The entire disclosure of Japanese Patent Application No. 2019-180021 filed on Sep. 30, 2019 is incorporated herein by reference in its entirety.

BACKGROUND

Technological Field

The present disclosure relates to a post-processing apparatus that cuts sheets and an image forming system.

Description of the Related Art

There is a post-processing apparatus that performs post-processing of cutting a sheet along four sides of an image printed thereon by an image forming apparatus, thereby forming a sheet composed of the image without a border or with a border of a predetermined width.

In a post-processing apparatus as described above, when cutting directions of a sheet incline from four sides of an image, the quality of a product generated by cutting is low. Hence, the post-processing apparatus reads an image formed on a sheet by an image forming apparatus, obtains the inclination of the image in relation to the sheet, corrects the orientation of the sheet, and then cuts on a peripheral line of the image. (See JP 2019-48692 A.)

SUMMARY

However, the conventional post-processing apparatus described above requires a scanner or a camera for reading images, and accordingly requires an image data memory, an arithmetic processing element capable of high-speed analysis, and so forth for analyzing the images and calculating the inclinations of the images in relation to the sheets, This may lead to major increase in cost of the post-processing apparatus.

Objects of the present disclosure include providing a post-processing apparatus and an image forming system that correct the inclination of a sheet more easily and/or at low cost.

In order to achieve at least one of the abovementioned objects, according to a first aspect of the present disclosure, there is provided a post-processing apparatus including:

a cutting device that cuts a sheet along one or both of a feed direction in which the sheet is conveyed and a cross direction perpendicular to the feed direction;

one or both of an inclination detector that detects a front edge of the sheet in the feed direction at multiple positions in the cross direction and a side-edge detector that detects a position of a side edge of the sheet in the cross direction;

an inclination corrector that performs an inclination correction operation of correcting an inclination of the sheet; and a hardware processor that causes the cutting device to cut the sheet after causing the inclination corrector to perform the inclination correction operation on the sheet for an amount of the inclination of the sheet based on the detection by the inclination detector or the detection by the side-edge detector.

In order to achieve at least one of the abovementioned objects, according to a second aspect of the present disclosure, there is provided an image forming system including: an image forming apparatus that forms an image on a sheet; and the post-processing apparatus.

In order to achieve at least one of the abovementioned objects, according to a third aspect of the present disclosure, there is provided a post-processing apparatus including:

a cutting device that cuts a sheet along one or both of a feed direction in which the sheet is conveyed and a cross direction perpendicular to the feed direction;

an inclination corrector that performs an inclination correction operation of correcting an inclination of the sheet; and a hardware processor that causes the cutting device to cut the sheet after causing the inclination corrector to perform the inclination correction operation on the sheet, wherein the inclination corrector includes a pair of rollers on an upstream side and a pair of rollers on a downstream side in the feed direction, and wherein the hardware processor causes the inclination corrector to perform the inclination correction operation in which the pair of rollers on the upstream side convey the sheet until a front edge of the sheet hits a nip portion of the pair of rollers on the downstream side that stop, and restart to convey the sheet after the pair of rollers on the downstream side start to convey the sheet.

In order to achieve at least one of the abovementioned objects, according to a fourth aspect of the present disclosure, there is provided an image forming system including: an image forming apparatus that forms an image on a sheet; and the post-processing apparatus.

In order to achieve at least one of the abovementioned objects, according to a fifth aspect of the present disclosure, there is provided a post-processing apparatus including:

a cutting device that cuts a sheet along one or both of a feed direction in which the sheet is conveyed and a cross direction perpendicular to the feed direction;

an inclination corrector that performs an inclination correction operation of correcting an inclination of the sheet; and a hardware processor that causes the cutting device to cut the sheet after causing the inclination corrector to perform the inclination correction operation on the sheet, wherein the inclination corrector includes a shutter that blocks and unblocks a conveyance path for the sheet, a driver that drives the shutter to block and unblock the conveyance path, and a pair of rollers that convey the sheet to the shutter, and wherein the hardware processor causes the inclination corrector to perform the inclination correction operation in which the pair of rollers convey the sheet until a front edge of the sheet hits the shutter that blocks the conveyance path, and after the pair of rollers once release the sheet, the shutter unblocks the conveyance path and the pair of rollers restart to convey the sheet.

In order to achieve at least one of the abovementioned objects, according to a sixth aspect of the present disclosure, there is provided an image forming system including: an image forming apparatus that forms an image on a sheet; and the post-processing apparatus.

BRIEF DESCRIPTION OF THE DRAWINGS

The advantages and features provided by one or more embodiments of the present invention will become more fully understood from the detailed description given hereinbelow and the appended drawings that are given by way of illustration only, and thus are not intended as a definition of the limits of the present invention, wherein:

FIG. 20 is an illustration to explain a cutting position(s) in a case where the inclination of a sheet is not cancelled;

FIG. 21 shows a specific case where results of two rounds of detection of the inclination of a sheet are used for the second round of the inclination correction operation;

FIG. 22 is a side view of an inclination corrector according to a second embodiment of the present disclosure;

DETAILED DESCRIPTION OF EMBODIMENTS

Hereinafter, one or more embodiments of the present invention will be described in detail with reference to the drawings. However, the scope of the invention is not limited to the disclosed embodiments or illustrated examples.

First Embodiment

Figure 1:
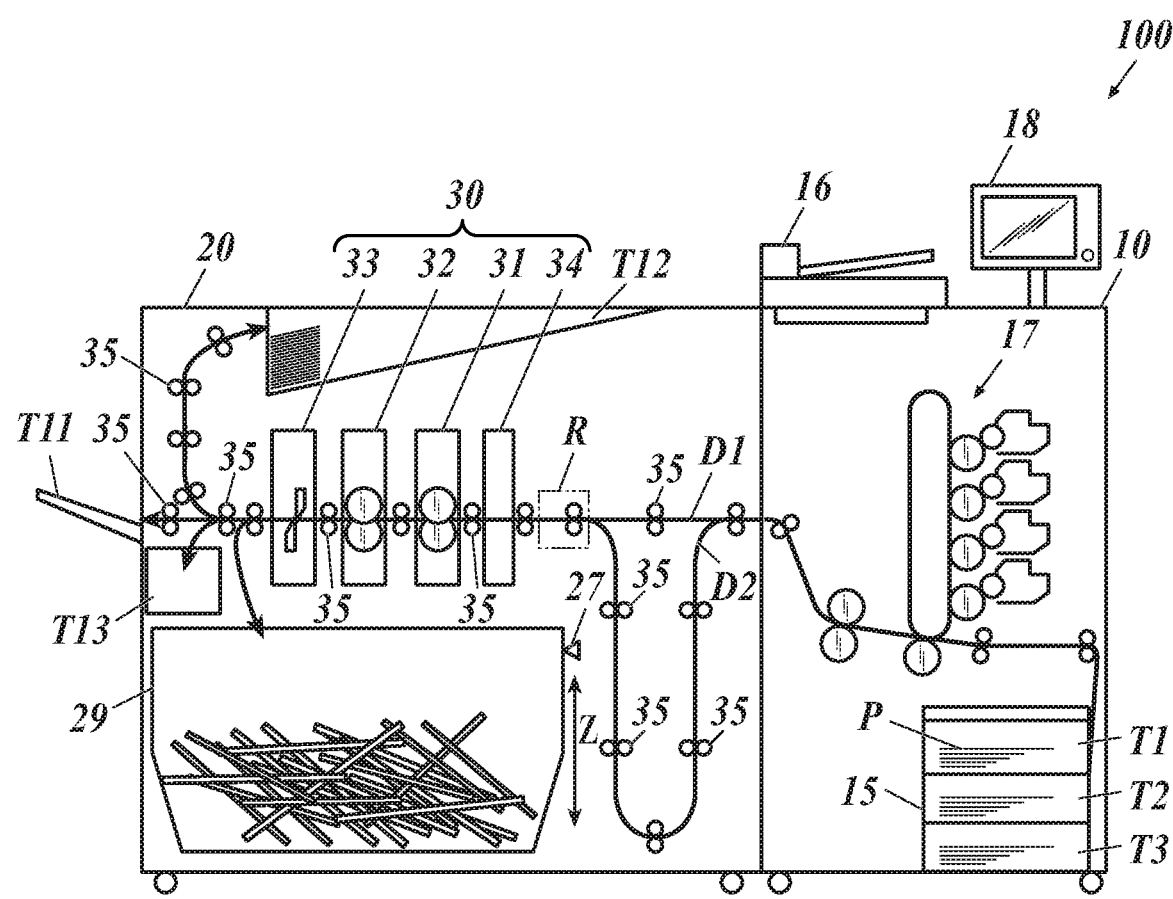
FIG. 1 shows a configuration of an image forming system according to a first embodiment of the present disclosure.

FIG. 1 shows a configuration of an image forming system 100 according to a first embodiment of the present disclosure. The image forming system 100 includes an image forming apparatus 10 that forms images G on sheets of paper P and a post-processing apparatus 20 that cuts the sheets of paper P having the images G formed by the image forming apparatus 10.

The image forming apparatus 10 form images on sheets of paper P in accordance with operation commands input through an operation/display unit 18 or image forming commands received from a personal computer (PC) or the like via a communication network. The image forming apparatus 10 conveys (feeds) the sheets of paper P having the images thereon to the post-processing apparatus 20.

The image forming apparatus 10 includes a sheet feeder 15, an image reader 16, an image forming unit 17 and the operation/display unit 18.

The sheet feeder 15 includes sheet feed trays T1 to T3 where sheets of paper P different in size, type (paper type), basis weight and so forth are storable, and feeds sheets of paper P in a specified feeding tray T1, T2 or T3 to the image forming unit 17.

The image reader 16 reads documents and generates image data. More specifically, in the image reader 16, a charge coupled device (CCD) image sensor or the like reads light that is emitted from a light source and received on a document(s).

The image forming unit 17 forms images on sheets of paper P. In the image forming unit 17, chargers charge photoreceptors, exposure units emit laser beams based on image data to the charged photoreceptors to expose and scan the charged photoreceptors, thereby forming electrostatic latent images, developing units develop the electrostatic latent images with toner, thereby forming toner images, a transfer unit transfers a toner image composed of the toner images to a sheet P, and a fixing unit fixes the toner image to the sheet P.

The operation/display unit 18 is composed of a liquid crystal display (LCD), and includes: a display unit that displays various screens; and an operation unit including a touchscreen overlaid on the display unit and/or various keys. The operation/display unit 18 outputs operation signals input by operations on the touchscreen or operations on the keys to a central processing unit (CPU) 11 (shown in FIG. 16).

[Post-Processing Apparatus]

The post-processing apparatus 20 is a cutting apparatus that cuts sheets of paper P. The post-processing apparatus 20 cuts a sheet P conveyed from the image forming apparatus 10 as needed, and ejects a product(s) generated by the cutting to a sheet receiving tray T11/T12 or a card tray T13.

The post-processing apparatus 20 includes a conveyance path D1, a cutting device 30, a sensor 27 and a wastepaper basket 29.

The conveyance path D1 is provided with a long-sheet conveyance path D2 that branches from the conveyance path D1 and joins the conveyance path D1 at a point on the downstream side. The long-sheet conveyance path D2 is used as a buffer when long sheets are conveyed.

Each of the conveyance paths D1, D2 is provided with conveying roller sets 35 disposed at predetermined intervals along the conveyance path. The conveying roller sets 35 are each composed of a pair of rollers 351, 352 that are disposed so as to hold a sheet P from the front side and the back side thereof, and convey the sheet P by rotating.

The cutting device 30 cuts sheets of paper P conveyed thereto. The cutting device 30 includes FD cutters 31, 32, a CD cutter 33 and a perforation cutter 34 disposed at multiple positions on the conveyance path D1.

The FD cutters 31, 32 are each a slitter that cuts a sheet P along a feed direction F in which sheets of paper P are conveyed. The FD cutter 31 is a head/foot slitter that cuts off, along the feed direction F, edge portions (on the far side and the near side) of a sheet P in a direction (hereinafter "cross direction C") parallel to the surface (plane) of the sheet P and perpendicular to the feed direction F. The FD cutter 32 is a bleed trimming slitter that cuts off, along the feed direction F, a space of a sheet P between pre-products that are adjacent to one another in the cross direction C.

Each of the FD cutters 31, 32 includes an actuator (not shown), such as a motor, and can adjust its cutting position in the cross direction C as appropriate, and hence can cut a sheet P along the feed direction F at a position(s) that is a predetermined distance away from a side edge S of the sheet P in the cross direction C.

The CD cutter 33 is a guillotine cutter that cuts a sheet P along the cross direction C. The CD cutter 33 can adjust its cutting position in the feed direction F in cooperation with the conveying roller sets 35 as appropriate.

The perforation cutter 34 is a cutter that cuts a sheet P along the cross direction C to be perforated. Additionally or alternatively, a perforation cutter that cuts a sheet P along the feed direction F to be perforated may be provided.

Which one or more of the FD cutter 31, the FD cutter 32 and the CD cutter 33 are used is determined in accordance with a cutting mode to be used. The cutting mode is a cutting control method that is determined by the type of cutting, the size, type and/or basis weight of a sheet P, and/or the like.

Hereinafter, cutting modes classified by type of cutting will be described with reference to FIG. 2A to FIG. 2D.

Figure 2A:
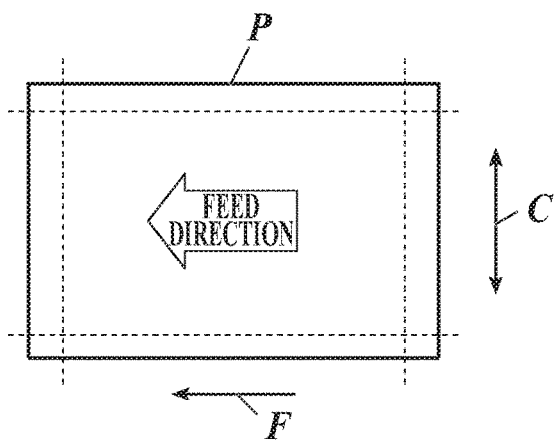
FIG. 2A shows an example of cutting in a four-side cutting mode.

FIG. 2A shows an example of cutting in a four-side cutting mode. In the four-side cutting mode, four edge portions of a sheet P are cut off, so that one product is generated from one sheet P. More specifically, the edge portions (edge portion on the far side and edge portion on the near side) of a sheet P in the cross direction C are cut off by the FD cutter 31, and the front edge portion (edge portion on the downstream side) and the rear edge portion (edge portion on the upstream side) of the sheet P in the feed direction F are cut off by the CD cutter 33.

Figure 2B:
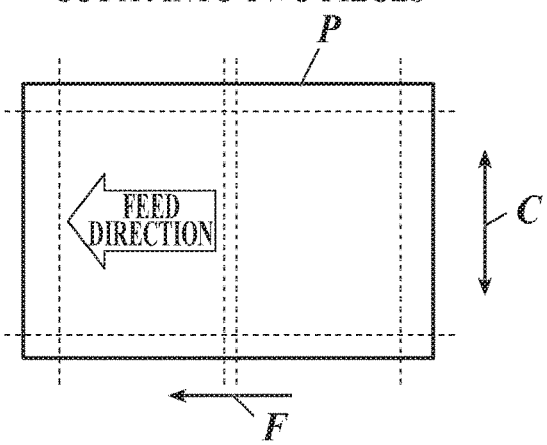
FIG. 2B shows an example of cutting in a multiple cutting mode.
Figure 2C:
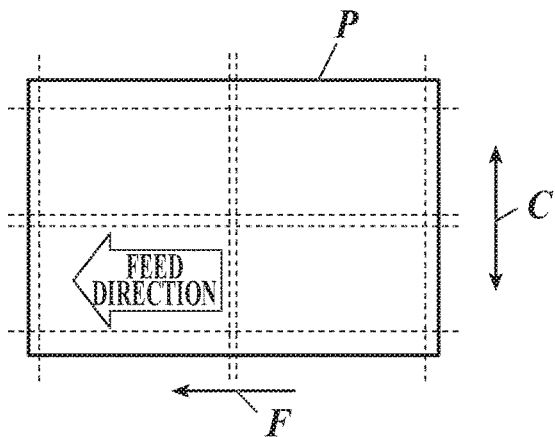
FIG. 2C shows an example of cutting in another multiple cutting mode.
Figure 2D:
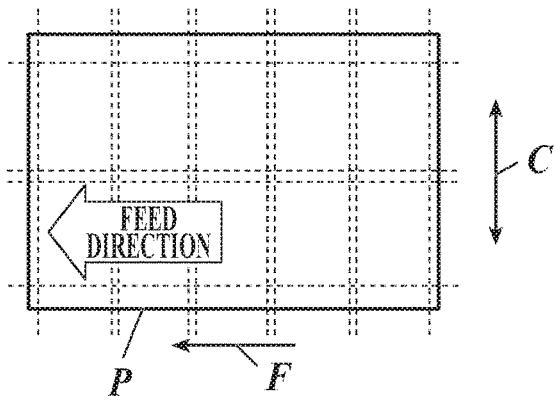
FIG. 2D shows an example of cutting in another multiple cutting mode.

FIG. 2B to FIG. 2D show examples of cutting in multiple cutting modes. In the multiple cutting modes, four edge portions of a sheet P are cut off, and the sheet P is also cut at one or more positions along the feed direction F and/or the cross direction C, so that multiple products are generated from one sheet P.

In a multiple cutting mode for cutting/dividing an A4-size sheet P into two pieces in the feed direction F shown in FIG. 2B, the edge portions (edge portion on the far side and edge portion on the near side) of a sheet P in the cross direction C are cut off by the FD cutter 31, and the front edge portion and the rear edge portion of the sheet P in the feed direction F are cut off and a space of the sheet P between pre-products that are adjacent to one another in the feed direction F is cut (or trimmed off) by the CD cutter 33.

In a multiple cutting mode for creating cards shown in FIG. 2C, the edge portions (edge portion on the far side and edge portion on the near side) of a sheet P in the cross direction C are cut off by the FD cutter 31, a space of the sheet P between pre-products that are adjacent to one another in the cross direction C is cut (or trimmed off) by the FD cutter 32, and the front edge portion and the rear edge portion of the sheet P in the feed direction F are cut off and a space of the sheet P between pre-products that are adjacent to one another in the feed direction F is cut (or trimmed off) by the CD cutter 33.

In a multiple cutting mode for creating business cards shown in FIG. 2D, the edge portions (edge portion on the far side and edge portion on the near side) of a sheet P in the cross direction C are cut off by the FD cutter 31, a space of the sheet P between pre-products that are adjacent to one another in the cross direction C is cut (or trimmed off) by the FD cutter 32, and the front edge portion and the rear edge portion of the sheet P in the feed direction F are cut off and spaces of the sheet P between pre-products that are adjacent to one another in the feed direction F are cut (or trimmed off) by the CD cutter 33.

The FD cutters 31, 32, the CD cutter 33 and the perforation cutter 34 constituting the cutting device 30 may each be modularized and attachable/detachable to/from the main body of the post-processing apparatus 20. The order of arrangement of the modules is changeable.

Figure 16:
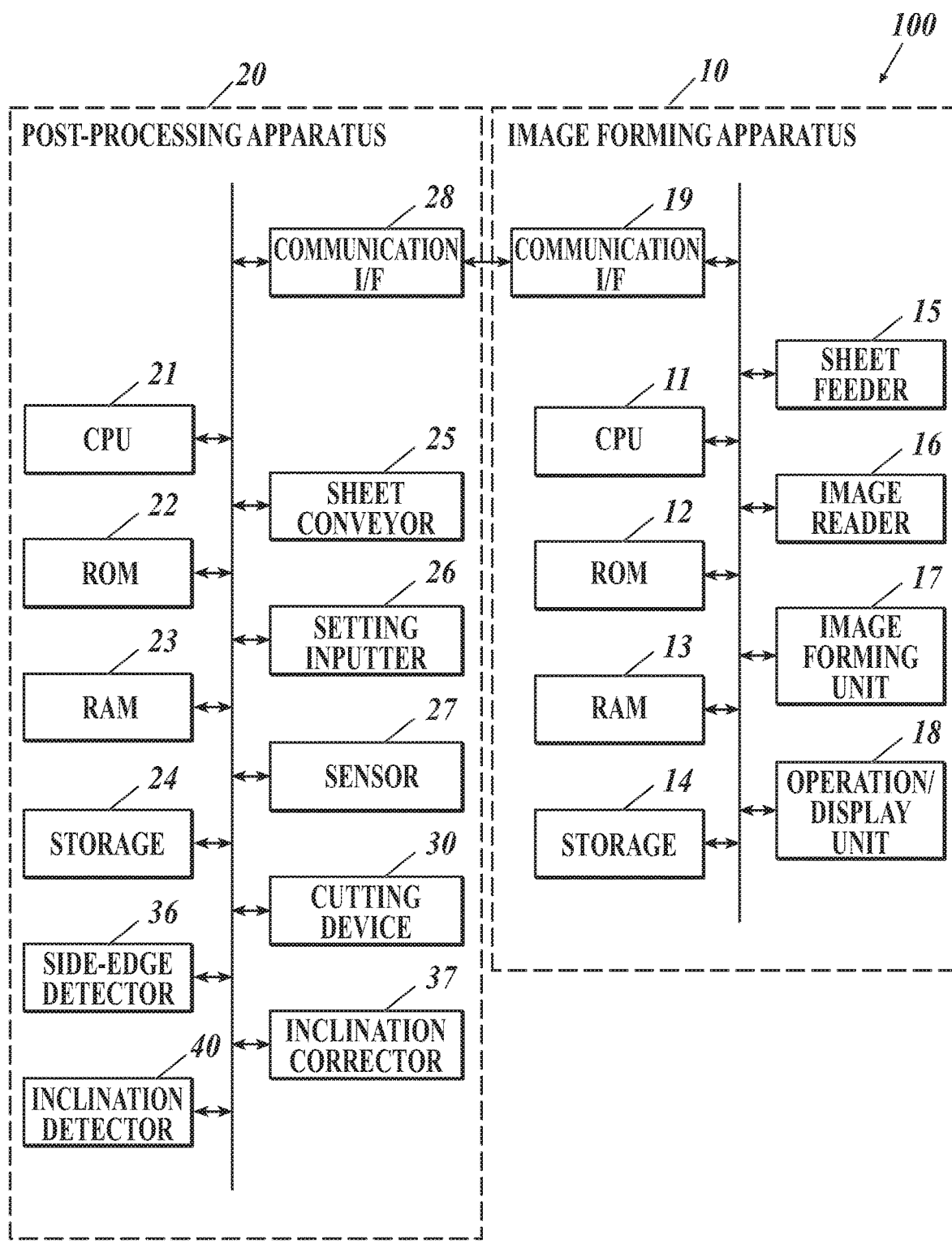
FIG. 16 is a block diagram showing a functional configuration of the image forming system.

The sensor 27 detects wastepaper at a predetermined position (level) in the depth direction (Z direction shown in FIG. 1) in the wastepaper basket 29, and outputs the detection result to a CPU 21 (shown in FIG. 16). More specifically, the sensor 27 detects whether wastepaper is loaded in the wastepaper basket 29 to a certain amount.

The wastepaper basket 29 is disposed below the cutting device 30, and stores wastepaper that is generated by the cutting device 30 cutting sheets P and falls from the cutting device 30. A user of the post-processing apparatus 20 (or image forming system 100) opens the door of the post-processing apparatus 20, takes out the wastepaper basket 29, and disposes of the wastepaper in the wastepaper basket 29.

[Inclination Correction Section]

As shown in FIG. 1, in the post-processing apparatus 20, an inclination correction section R is set on the conveyance path D1 on the upstream side of the cutting device 30 in the feed direction F. In the inclination correction section R, the inclination of a sheet P is corrected.

In the inclination correction section R, various components are disposed to detect the inclination of a sheet P from a reference direction as a standard orientation and correct the orientation (inclination) of the sheet P to match the reference direction, right before the sheet P reaches the cutting device 30. Correcting the orientation of a sheet P to match the reference direction as the standard orientation in the inclination correction section R, namely right before cutting the sheet P, can realize proper sheet cutting.

Figure 3:
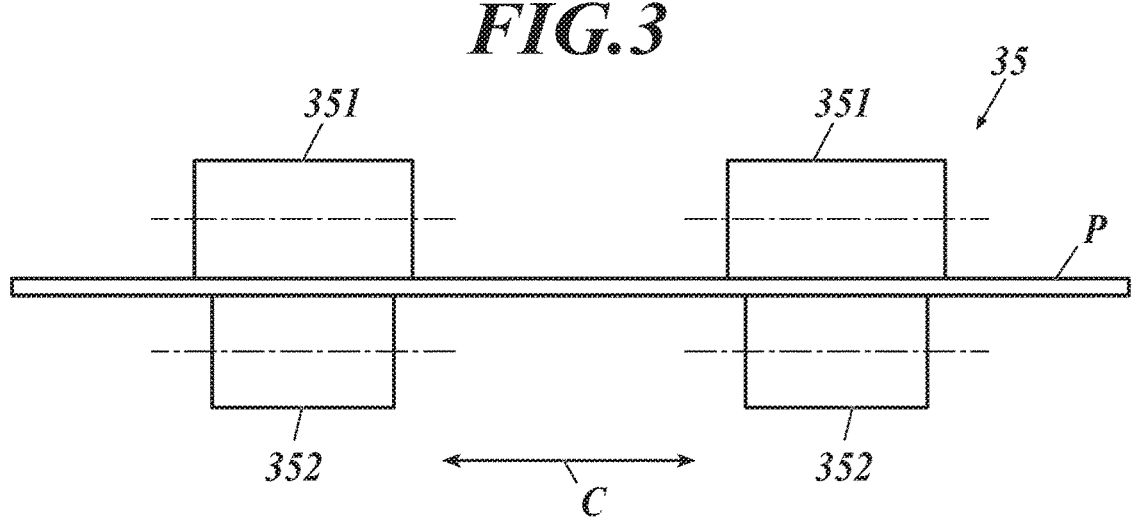
FIG. 3 shows conveying rollers disposed on a conveyance path as viewed from a feed direction.
Figure 4:
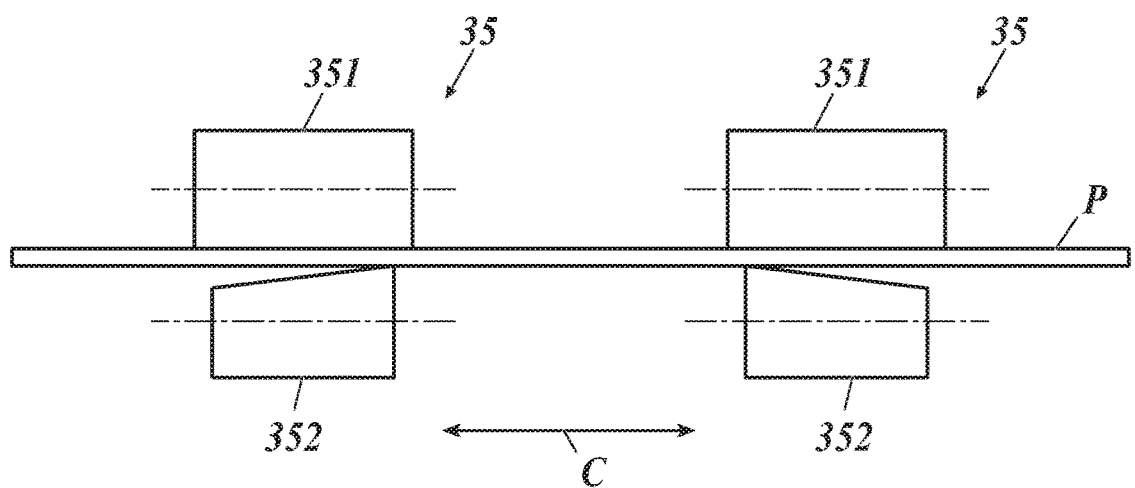
FIG. 4 shows conveying rollers disposed on the conveyance path as viewed from the feed direction.
Figure 5:
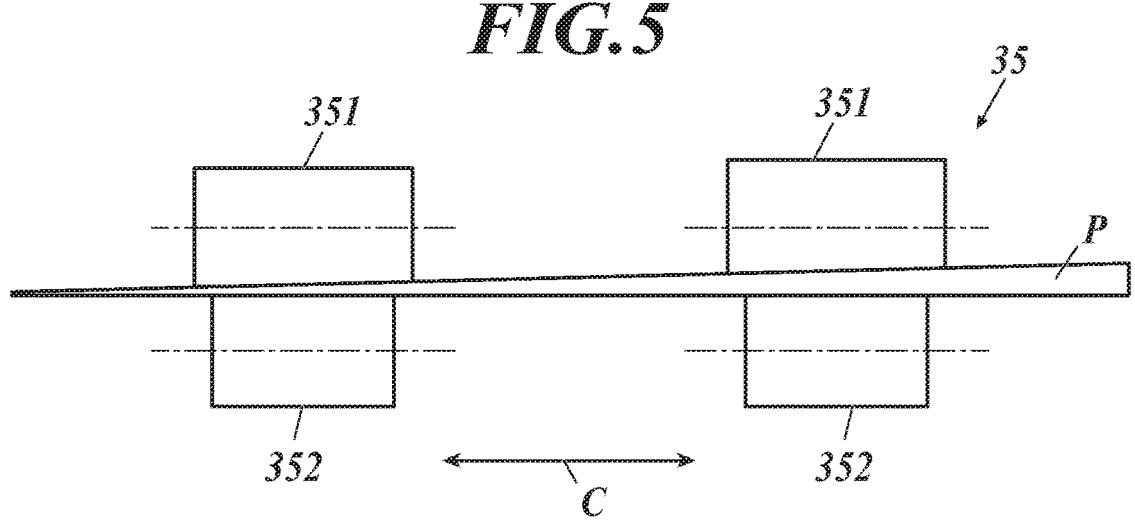
FIG. 5 shows conveying rollers disposed on the conveyance path as viewed from the feed direction.

FIG. 3 to FIG. 5 show the conveying roller sets 35 disposed on the aforementioned conveyance path D1/D2 as viewed from the feed direction F.

As shown in FIG. 3, when a sheet P is substantially uniform in thickness, and the rollers 351, 352 of the conveying roller sets 35 have been manufactured with proper processing accuracy and assembled with proper assembly accuracy, the sheet P can be conveyed parallel to a proper feed direction F.

In contrast, for example, when the rollers 351, 352 have been manufactured with low processing accuracy or have worn, and consequently each or any do not have a uniform outer diameter in its central axis direction as shown in FIG. 4, or when the rollers 351, 352 have been assembled with an assembly error, and consequently each or any have a central axis not parallel to its standard (correct) central axis, a sheet P rotates on an axis perpendicular to the surface of the sheet P and inclines from the proper feed direction F. Further, as shown in FIG. 5, when a sheet P is not uniform in thickness in the cross direction C, the sheet P inclines.

The proper feed direction F changes depending on whether the image forming apparatus 10 forms an image on a sheet P with the front edge K of the sheet P as a reference or with the side edge S of the sheet P as a reference.

Figure 6:
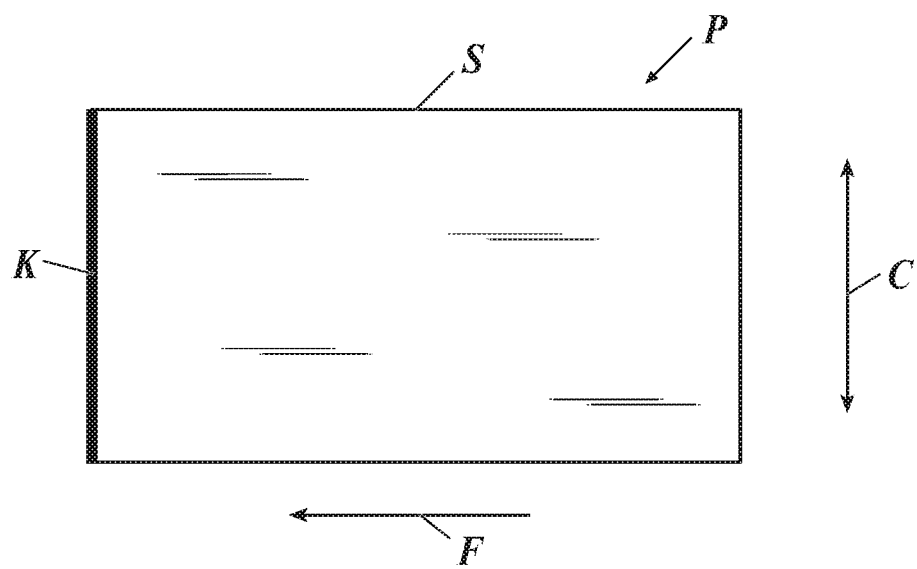
FIG. 6 is a plan view in a case where a reference for image forming is a front edge of a sheet in the feed direction.

For example, FIG. 6 shows a case where the reference for image forming is the front edge K of a sheet P in the feed direction F. The front edge K of the sheet P in the feed direction F serving as the reference for image forming is exhibited by a bold line.

In the case where the reference for image forming is the front edge K of a sheet P in the feed direction F, an image G is formed along the front edge K.

Figure 7:
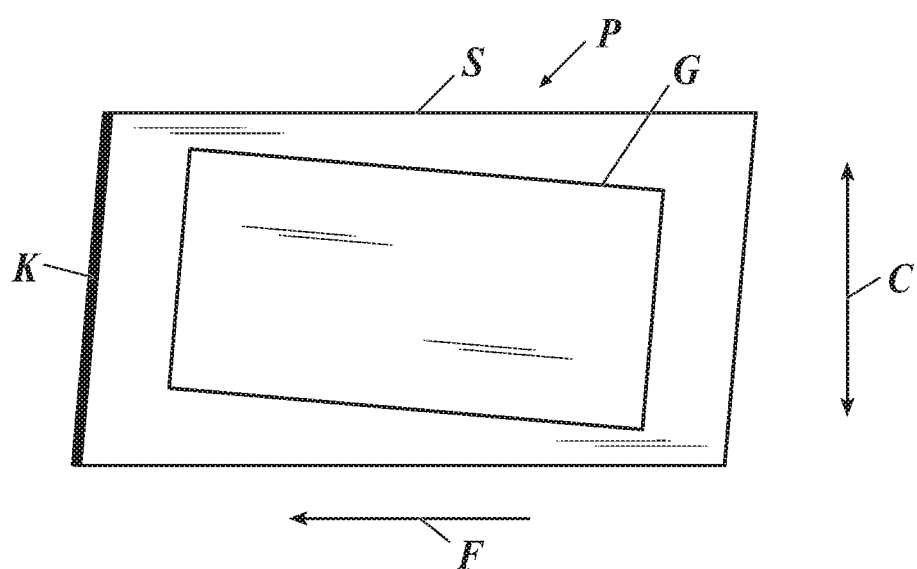
FIG. 7 is a plan view at the time of image forming in the case where the reference for image forming is the front edge of the sheet in the feed direction.
Figure 8:
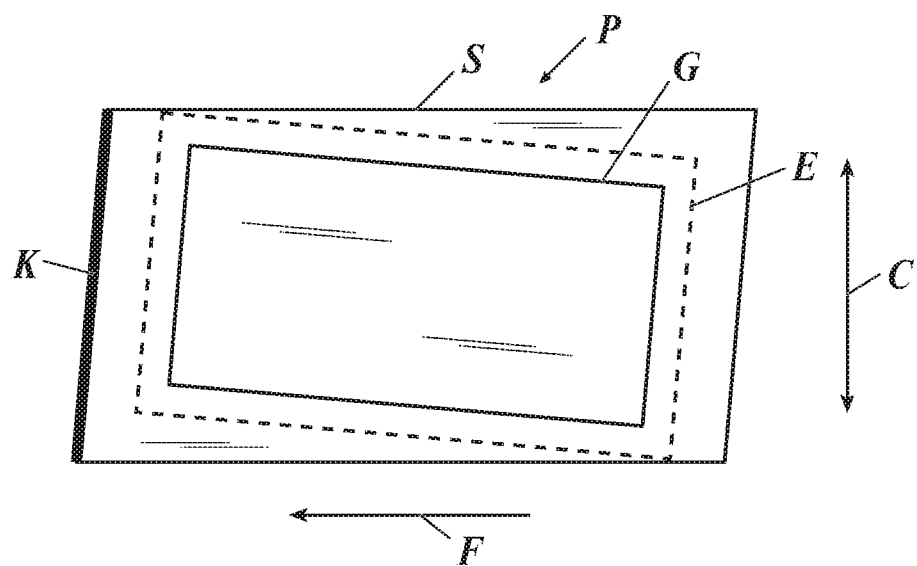
FIG. 8 is a plan view at the time of cutting in the case where the reference for image forming is the front edge of the sheet in the feed direction.

On this premise, for example, as shown in FIG. 7, when the front edge K is not at right angles to the side edge S, which is along the feed direction F, in order to properly cut on (along) a peripheral line E of the image G along the edges of the image G as shown in FIG. 8, the inclination of the sheet P needs to be corrected such that the front edge K of the sheet P is perpendicular to the feed direction F (is parallel to the cross direction C), if the sheet P is conveyed such that the side edge S is parallel to the feed direction F.

Even when the front edge K is at right angles to the side edge S, which is along the feed direction F, if the sheet P is conveyed in front of the cutting device 30 with the front edge K inclined from the cross direction C, the inclination of the sheet P needs to be corrected.

Figure 9:
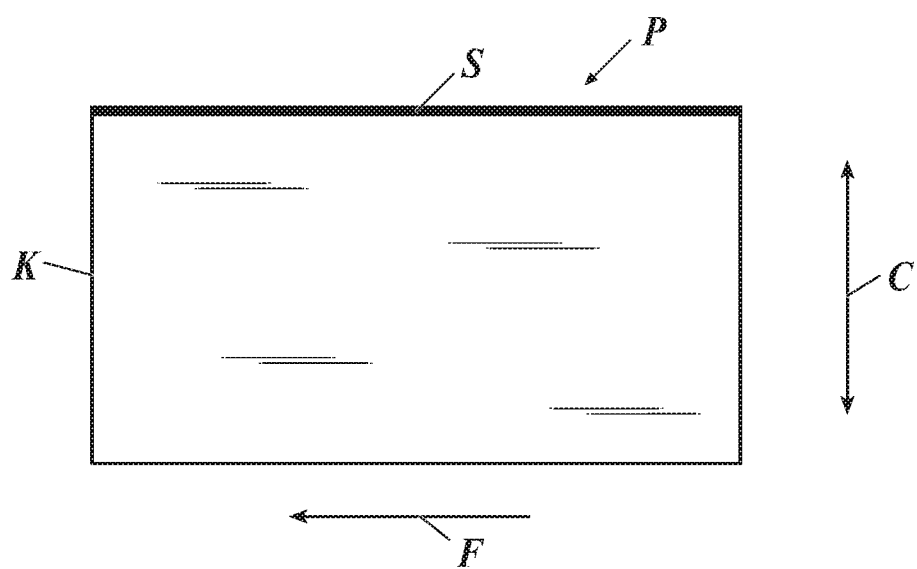
FIG. 9 is a plan view in a case where the reference for image forming is a side edge of a sheet in a cross direction perpendicular to the feed direction.

FIG. 9 shows a case where the reference for image forming is the side edge S, which is one of two side edges of a sheet P in the cross direction C. The side edge S of the sheet P serving as the reference for image forming is exhibited by a bold line.

Figure 10:
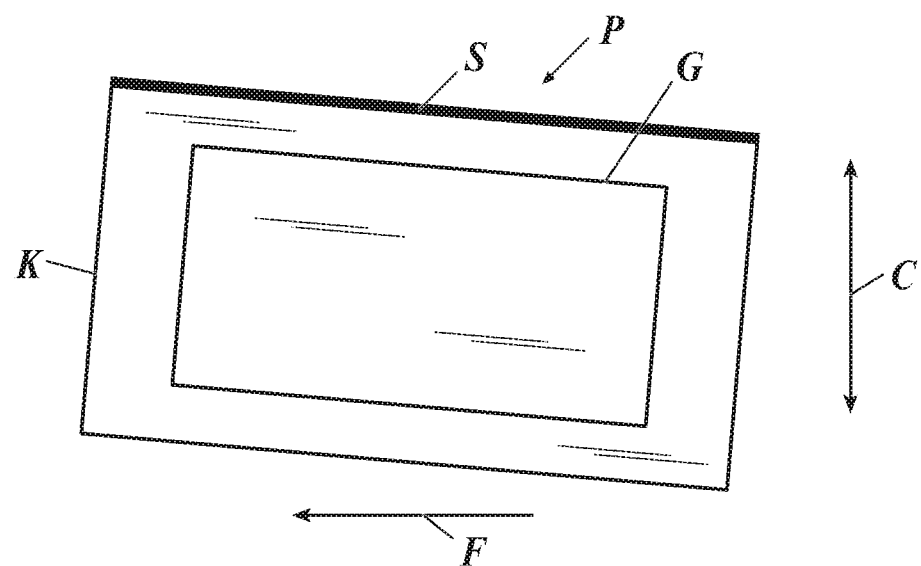
FIG. 10 is a plan view at the time of image forming in the case where the reference for image forming is the side edge of the sheet in the cross direction.
Figure 11:
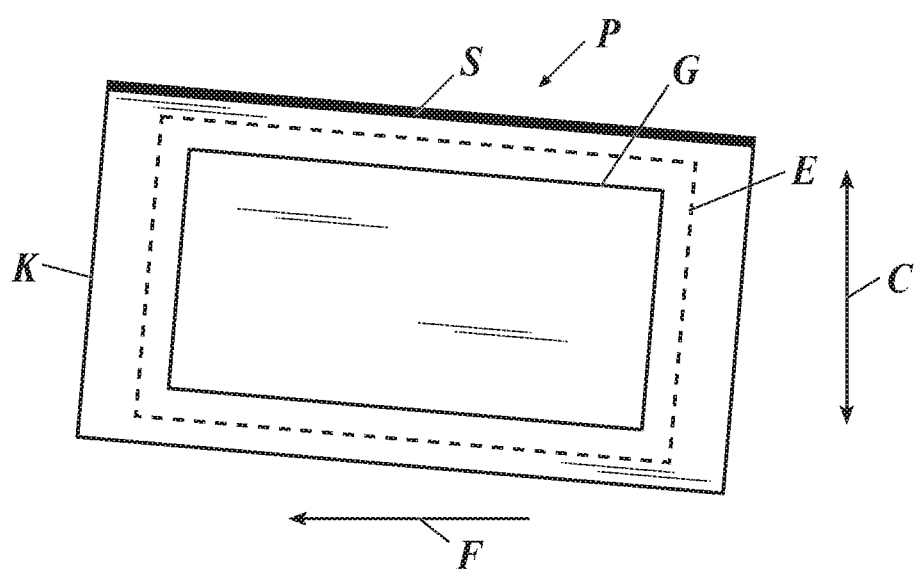
FIG. 11 is a plan view at the time of cutting in the case where the reference for image forming is the side edge of the sheet in the cross direction.

In the case where the reference for image forming is the side edge S of a sheet P, for example, if the sheet P is conveyed in the front of the cutting device 30 with the side edge S inclined from the feed direction F and accordingly not parallel to the feed direction F as shown in FIG. 10, in order to properly cut on a peripheral line E of an image G along the edges of the image G as shown in FIG. 11, the inclination of the sheet P needs to be corrected such that the side edge S of the sheet P is parallel to the feed direction F.

Figure 12:
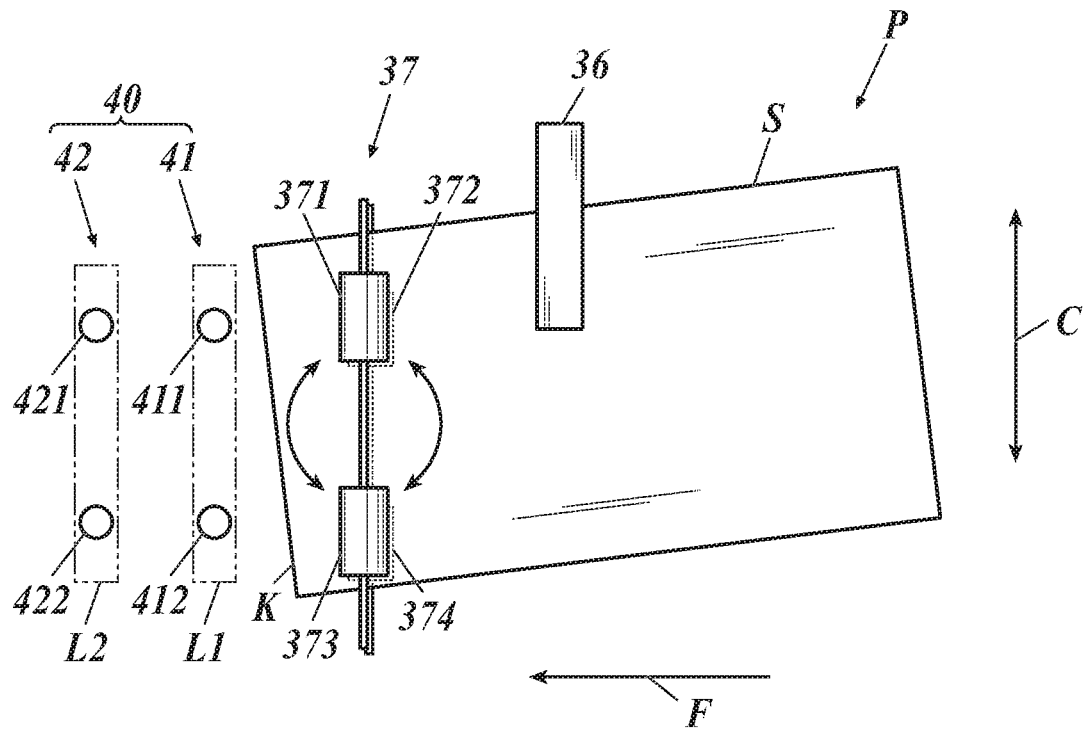
FIG. 12 is a plan view showing main components arranged in an inclination correction section.
Figure 13:
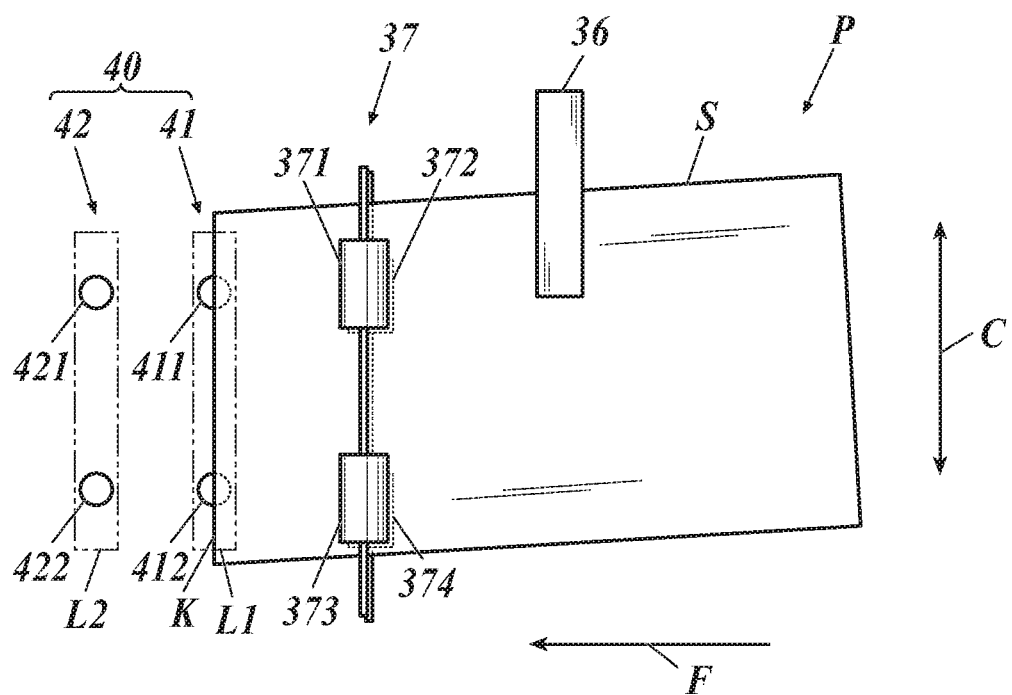
FIG. 13 is a plan view showing the main components arranged in the inclination correction section, and shows a state in which the front edge of a sheet is at a first detection position.
Figure 14:
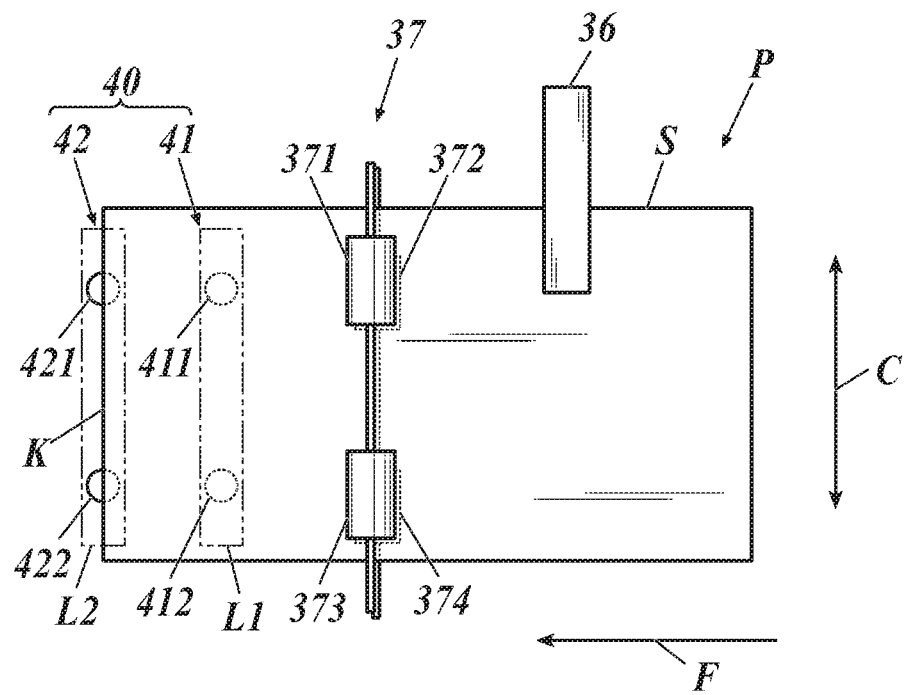
FIG. 14 is a plan view showing the main components arranged in the inclination correction section, and shows a state in which the front edge of the sheet is at a second detection position.

FIG. 12 to FIG. 14 are plan views showing main components arranged in the inclination correction section R.

In order to deal with the above-described need to correct the inclination of a sheet P, as shown in FIG. 12 to FIG. 14, a side-edge detector 36, an inclination corrector 37 and an inclination detector 40 are arranged in the inclination correction section R in this order from the upstream side in the feed direction F.

[Inclination Corrector in Inclination Correction Section]

As shown in FIG. 12, the inclination corrector 37 is a rotational corrector that rotates a sheet P with a difference in the amount of rotation between two pairs of rollers (rollers 371 to 374) that are aligned along the cross direction C.

The inclination corrector 37 includes: a pair of rollers 371, 372 on the far side in the cross direction C so as to hold a sheet P from the front side and the back side thereof and a pair of rollers 373, 374 on the near side in the cross direction C so as to hold the sheet P from the front side and the back side thereof. The pair of rollers 371, 372 on the far side and the pair of rollers 373, 374 on the near side are provided with their respective rotational drive sources, and rotation speeds of the rotational drive sources are controlled by the CPU 21 as a controller (hardware processor) (shown in FIG. 16), which is included in the post-processing apparatus 20.

The inclination corrector 37 can correct the inclination of a sheet P by being controlled by the CPU 21 such that the rotation speed of the pair of rollers 371, 372 on the far side and the rotation speed of the pair of rollers 373, 374 on the near side are different from one another, which rotates the sheet P on its axis, which is perpendicular to the surface of the sheet P.

[Side-Edge Detector in Inclination Correction Section]

The side-edge detector 36 is a line sensor that detects the position of the side edge S of a sheet P in the cross direction C, and has a light source along the cross direction C and a plurality of light receiving elements aligned along the cross direction C. The side-edge detector 36 can detect the boundary position between (i) the side edge S of a sheet P passing thereunder and (ii) a conveyance surface, according to the resolution of the light receiving elements.

The detection result of the position of the side edge S of the sheet P by the side-edge detector 36 is input to the CPU 21 of the post-processing apparatus 20 (shown in FIG. 16). The CPU 21 can obtain the position of the side edge S of the sheet P in the cross direction C from the detection result. The CPU 21 can also obtains an angle of inclination (inclination angle) of the side edge S of the sheet P from the feed direction F by calculating it from temporal change in the position of the side edge S of the sheet P.

Figure 15:
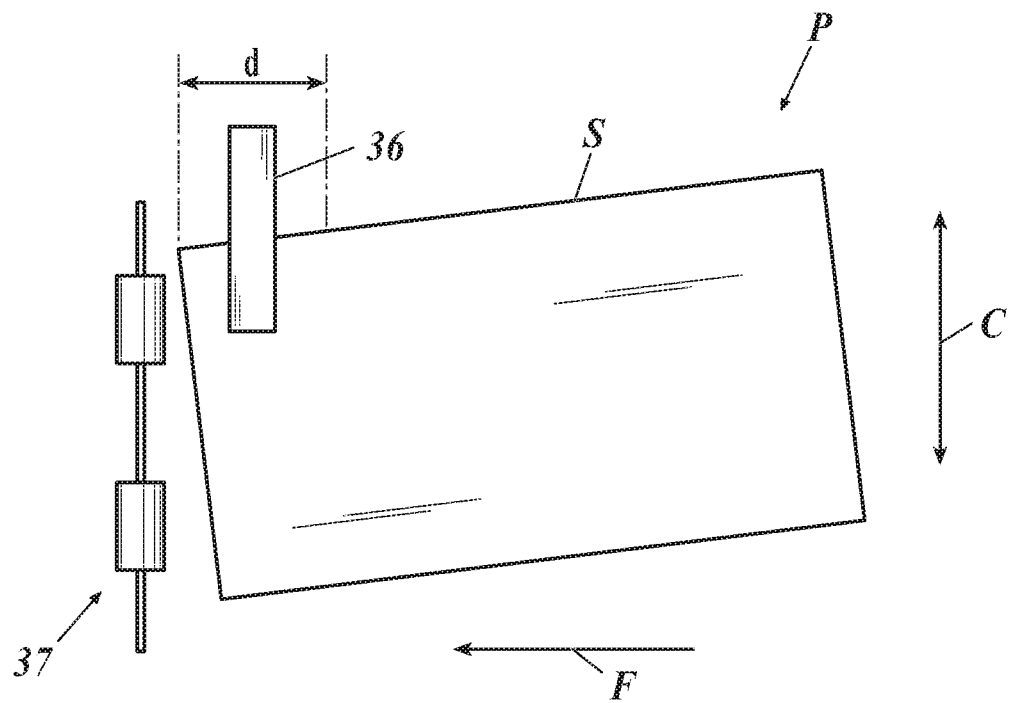
FIG. 15 is an illustration to explain the principle of calculating, from the position of the side edge of a sheet P in the cross direction, an angle of inclination of the side edge from the feed direction.

FIG. 15 is an illustration to explain the principle of calculating, from the position of the side edge S of a sheet P in the cross direction C, the inclination angle of the side edge S from the feed direction F. As shown in FIG. 15, on the premise that a sheet P is being conveyed along the feed direction F at a known value of a conveyance speed, the CPU 21 calculates, from the known value of the conveyance speed, a time that has been required to convey the sheet P a measurement distance d that is set sufficiently shorter than the entire length of the sheet P in the feed direction F, and obtains, from the side-edge detector 36, the amount of change (change amount) in the position of the side edge S of the sheet P in the cross direction C during the time. The CPU 21 can obtain a tangent value of the inclination angle of the side edge S of the sheet P from the feed direction F by dividing the change amount of the position of the side edge S of the sheet P in the cross direction C by the measurement distance d.

Because the measurement distance d is set sufficiently shorter than the entire length of the sheet P in the feed direction F, the inclination angle of the sheet P can be detected multiple times (e.g. twice) while the sheet P is passing through the side-edge detector 36. Hence, the CPU 21 may cause the inclination corrector 37 to perform the first round of an inclination correction operation on the sheet P after the first round of the detection of the inclination angle, and then cause the inclination corrector 37 to perform the second round of the inclination correction operation on the sheet P after the second round of the detection of the inclination angle, for example.

Hence, in/for the case where one time of the inclination correction operation cannot correct the inclination of a sheet P enough, the inclination correction operation can be performed again, so that the inclination of the sheet P can be sufficiently reduced.

[Inclination Detector in Inclination Correction Section]

The inclination detector 40 is for detecting the inclination angle of the front edge K of a sheet P from the cross direction C.

As shown in FIG. 12, the inclination detector 40 includes a first detector 41 that detects the front edge K at a first detection position L1 and a second detector 42 that detects the front edge K at a second detection position L2 on the downstream side of the first detection position L1 in the feed direction F.

The first detector 41 includes two optical sensors 411, 412, such as photo-interrupters, disposed on the conveyance surface, on/along which sheets of paper P are conveyed, so as to be aligned along the cross direction C. Changes in the amount of received light, which occur when the front edge K of a sheet P passes over these optical sensors 411, 412, are detected and input to the CPU 21.

Because the distance between the optical sensors 411, 412 in the cross direction C is a known value, and the conveyance speed of sheets of paper P is also a known value, when the CPU 21 receives, from the optical sensors 411, 412, signals indicating that the front edge K of the sheet P has passed over the optical sensors 411, 412, namely indicating that the optical sensors 411, 412 have detected the front edge K of the sheet P, the CPU 21 can calculate the inclination of the front edge K of the sheet P from the cross direction C, from a difference (time difference) between the detection timings at which the optical sensors 411, 412 have detected the front edge K of the sheet P.

Similar to the first detector 41, the second detector 42 includes two optical sensors 421, 422, such as photo-interrupters, disposed on the conveyance surface, on/along which sheets of paper P are conveyed, so as to be aligned along the cross direction C. The CPU 21 can calculate the inclination of the front edge K of a sheet P from the cross direction C, from outputs (signals) of the optical sensors 421, 422 indicating that the optical sensors 421, 422 have detected the front edge K of the sheet P.

Because the inclination detector 40 includes the first detector 41 and the second detector 42, the inclination detector 40 can detect the inclination angle of the front edge K of a sheet P twice.

Hence, the CPU 21 can cause the inclination corrector 37 to perform the inclination correction operation twice on a sheet P on the basis of the detection of the inclination angle of the front edge K of the sheet P performed twice, one time by the first detector 41 at the first detection position L1 and the other time by the second detector 42 at the second detection position L2.

[Control System of Image Forming System]

FIG. 16 is a block diagram showing a functional configuration of the image forming system 1.

The image forming apparatus 10 includes the CPU 11, a read only memory (ROM) 12, a random access memory (RAM) 13, a storage 14, the sheet feeder 15, the image reader 16, the image forming unit 17, the operation/display unit 18 and a communication interface (I/F) 19. Description of the functional components described above will not be repeated.

The CPU 11 reads out programs stored in the ROM 12, loads the read programs to the RAM 13, and controls operation of each component of the image forming apparatus 10 in cooperation with the loaded programs.

The ROM 12 includes a nonvolatile semiconductor memory, and stores, for example, a system program(s), various process programs executable on the system program, and various data.

The RAM 13 includes a volatile semiconductor memory, and forms a work area for temporarily storing programs read out from the ROM 12, input/output data, parameters and so forth, for the CPU 11 to perform various processes.

The storage 14 includes a hard disk drive (HDD) and/or a nonvolatile semiconductor memory, and stores various data.

The communication I/F 19 includes a network interface card (NIC) and a modem, and sends and receives data to from the post-processing apparatus 20 and/or a PC(s).

The post-processing apparatus 20 includes the CPU 21, a ROM 22, a RAM 23, a storage 24, a sheet conveyor 25, a setting inputter 26, the sensor 27, a communication I/F 28, the cutting device 30, the side-edge detector 36, the inclination corrector 37 and the inclination detector 40.

The CPU 21, the ROM 22 and the RAM 23 are the same as the CPU 11, the ROM 12 and the RAM 13, respectively, except that the target of control by the CPU 21 is the post-processing apparatus 20.

The storage 24 includes an HDD and/or a nonvolatile semiconductor memory, and stores various data. The storage 24 stores parameters required for calculating the inclinations of the front edge K and the side edge S of a sheet(s) P, such as the conveyance speed of the sheet P, the distance between the optical sensors 411, 412 or the optical sensors 421, 422 in the cross direction C, the measurement distance d for the side-edge detector 36, and table data showing a correspondence relationship of (i) the inclination angle of a sheet P and (ii) the difference in the rotation speed between the pair of the rollers 371, 372 on the far side and the pair of the rollers 373, 374 on the near side of the inclination corrector 37 to set.

The sheet conveyor 25 includes the conveying roller sets 35 disposed on the conveyance paths D1, D2, and conveys sheets of paper P received from the image forming apparatus 10 to the sheet receiving tray T1/T12 or the card tray T13.

The communication I/F 28 as a communication unit includes an NIC and a modem, and sends and receives data to and from the image forming apparatus 10.

As described above, in the post-processing apparatus 20, the CPU 21 can obtain the inclination angle of the side edge S of a sheet P from the feed direction F based on the detection by the side-edge detector 36 and the inclination angle of the front edge K of the sheet P from the cross direction C based on the detection by the inclination detector 40, but the CPU 21 chooses to obtain one of these two inclinations.

To the communication I/F 28, information or a choosing command for choosing to obtain one of the inclination angle based on the detection by the side-edge detector 36 and the inclination angle based on the detection by the inclination detector 40 is input from the outside.

More specifically, to the communication I/F 28, a choosing command to choose the inclination detector 40 or the side-edge detector 36 is input from the image forming apparatus 10.

Alternatively, to the communication I/F 28, information indicating whether an image G on a sheet P has been formed with the front edge K as a reference (shown in FIG. 7) or with the side edge S as a reference (shown in FIG. 10) is input from the image forming apparatus 10. When the communication I/F 28 receives an input of the information indicating that the front edge K is the reference, the CPU 21 chooses to obtain the inclination angle based on the detection by the inclination detector 40, whereas when the communication I/F 28 receives an input of the information indicating that the side edge S is the reference, the CPU 21 chooses to obtain the inclination angle based on the detection by the side-edge detector 36.

The setting inputter 26 as a choice inputter is an input interface including a keyboard and/or a touchscreen for the user to input predetermined information. Through the setting inputter 26, for example, setting information indicating whether to obtain the inclination angle based on the detection by the inclination detector 40 or to obtain the inclination angle based on the detection by the side-edge detector 36 is input.

For the case where both setting information input through the setting inputter 26 and information or a choosing command input through the communication I/F 28 are present, the priority order of application thereof is set in advance, and the CPU 21 obtains the inclination angle of a sheet P in accordance with the setting.

Through the setting inputter 26, the measurement distance d for the side-edge detector 36 can also be set as appropriate.

The CPU 21 mainly performs control on conveyance of sheets P, which is performed by the sheet conveyor 25, control on cutting of sheets P in a set cutting mode, which is performed by the cutting device 30, and control on the inclination correction operation in the inclination correction section R, which is performed by the inclination corrector 37 in cooperation with other components.

[Control on Inclination Correction Operation]

Figure 17:
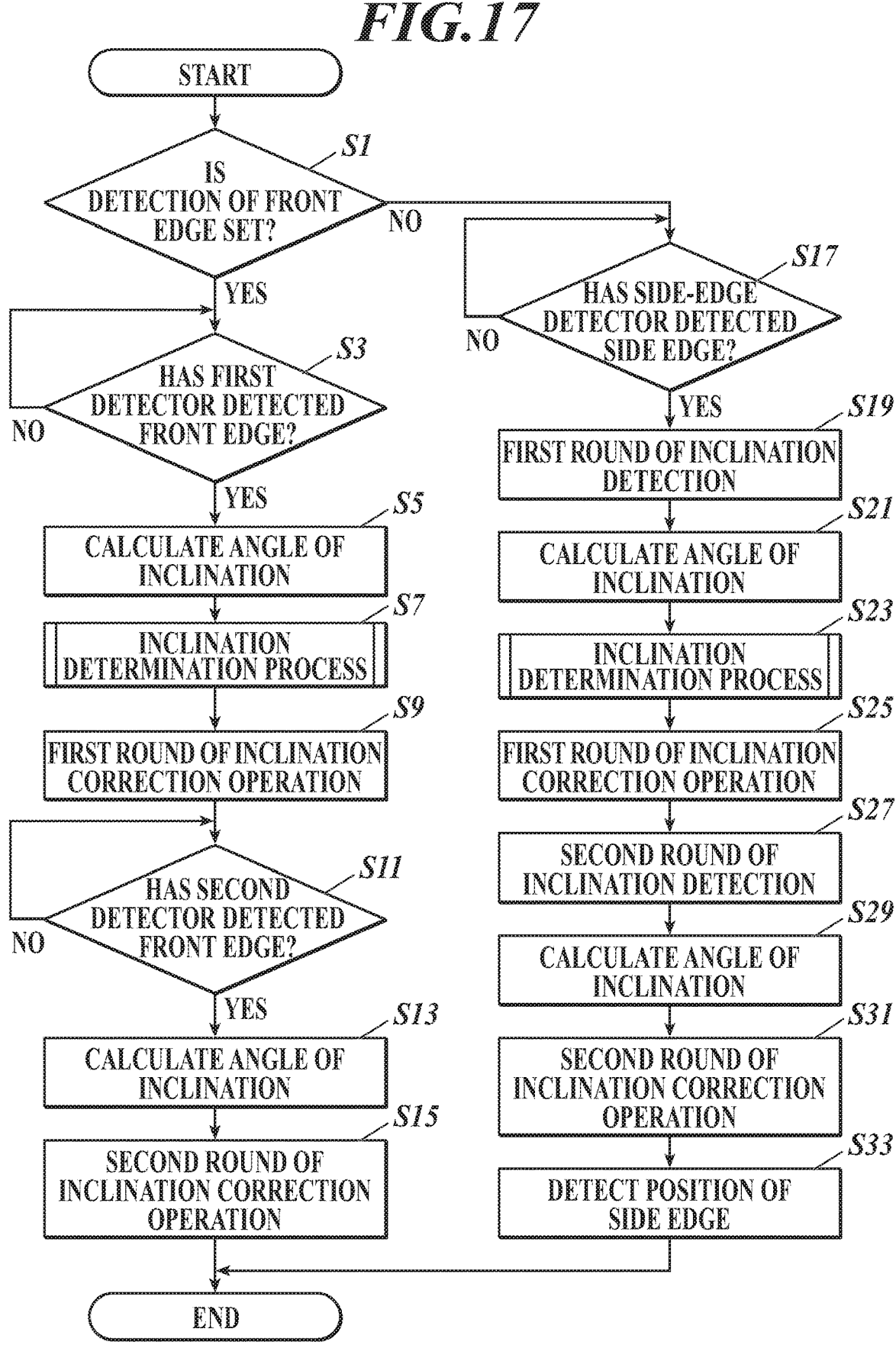
FIG. 17 is a flowchart of control on an inclination correction operation in the inclination correction section.

Hereinafter, the CPU 21's control on the inclination correction operation in the inclination correction section R will be described in detail with reference to flowcharts shown in FIG. 17 and FIG. 18.

First, the CPU 21 determines on the basis of setting information input through the setting inputter 26 or information or a choosing command input through the communication I/F 28 whether to obtain the inclination angle of a sheet P with the inclination detector 40 or to obtain the inclination angle of the sheet P with the side-edge detector 36 in a state in which the sheet P has been conveyed to the inclination correction section R (Step S1).

If the CPU 21 determines to obtain the inclination angle of the sheet P with the inclination detector 40 (Step S1: YES), the CPU 21 determines whether one of the optical sensors 411, 412 of the first detector 41 of the inclination detector 40 has detected the front edge K of the sheet P (Step S3).

The above determination is repeated until the front edge K of the sheet P is detected, and when the front edge K is detected, the CPU 21 starts to measure a time from the detection timing of the front edge K of the sheet P by the one of the two optical sensors 411, 412 to the detection timing thereof by the other of the two optical sensors 411, 412, and from the difference (time difference) between the detection timings, calculates the inclination angle of the front edge K of the sheet P from the cross direction C (Step S5) (shown in FIG. 12 to FIG. 13).

Next, the CPU 21 performs an inclination determination process on the calculated inclination angle of the sheet P (Step S7).

Figure 18:
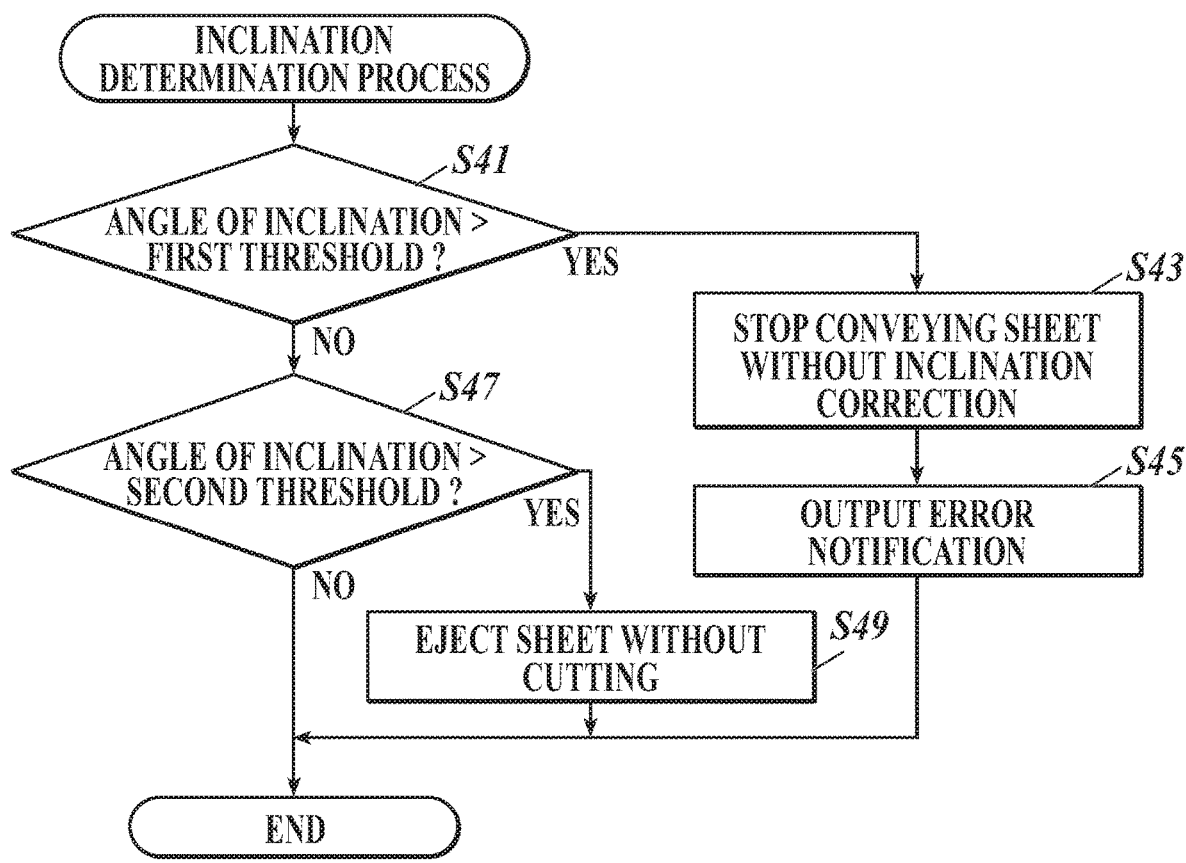
FIG. 18 is a flowchart of an inclination determination process included in the control on the inclination correction operation.

FIG. 18 is the flowchart of the inclination determination process.

The CPU 21 determines whether the calculated inclination angle of the sheet P exceeds a predetermined first threshold (Step S41).

Figure 19:
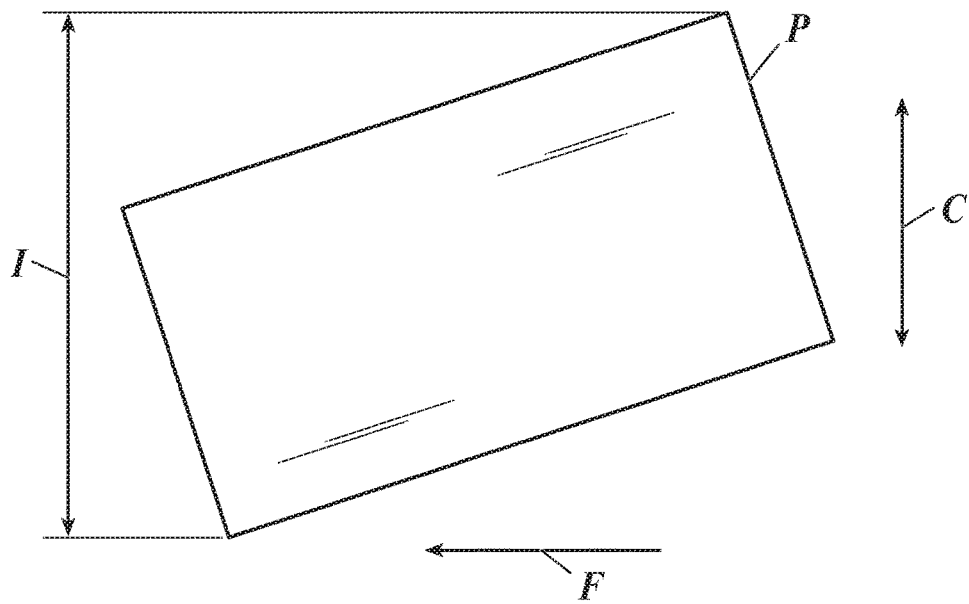
FIG. 19 is an illustration to explain a relationship of the inclination of a sheet and the width of the sheet in the cross direction.

As shown in FIG. 19, when a sheet P inclines up to the maximum value of 90°, a width I in the cross direction C becomes large. When the width I in the cross direction C is too large, the conveyance path (D1) is clogged with the sheet P (a paper jam occurs), and the sheet P cannot be conveyed. Hence, an angle (value) obtained by adding the maximum correctable angle, up to which the inclination corrector 37 can correct the inclination of a sheet P, to the minimum inclination angle, from which the conveyance path may be clogged with a sheet P, (or an angle (value) obtained by subtracting some angle (value) from the angle obtained by the adding, in order to leave some room) is set as the first threshold.

When the inclination angle of a sheet P calculated does not exceed the first threshold, the inclination corrector 37 can correct the inclination of the sheet P such that the width I of the sheet P in the cross direction C is within a range in which the sheet P can pass through the conveyance path, and consequently the sheet P can continue to be conveyed.

If the CPU 21 determines that the calculated inclination angle of the sheet P exceeds the first threshold (Step S41: YES), the CPU 21 performs control to stop conveying the sheet P on the spot without the inclination correction operation (Step S43), which is performed by the inclination corrector 37.

Then, the CPU 21 outputs an error notification indicating that the sheet P cannot be conveyed (Step S45). That is, the CPU 21 causes a not-shown display or warning sound generator included in the post-processing apparatus 20 to notify the user that the sheet P cannot be conveyed. The CPU 21 may output the error notification to the image forming apparatus 10, and the operation/display unit 18 may notify the user that the sheet P cannot be conveyed.

Then, the CPU 21 ends the inclination determination process. In this case, the CPU 21 stops (ends) the control on the inclination correction operation, accordingly.

If the CPU 21 determines that the calculated inclination angle of the sheet P does not exceed the first threshold (Step S41: NO), the CPU 21 determines whether the calculated inclination angle of the sheet P exceeds a predetermined second threshold (Step S47).

As described above, because the inclination corrector 37 has the maximum correctable angle according to its capability, when a sheet P inclines at an angle exceeding the maximum correctable angle, as shown in FIG. 20, the sheet P cannot be properly cut on a peripheral line E of an image G along the four sides (edges) of the image G. Hence, the maximum correctable angle (or an angle (value) obtained by subtracting some angle (value) from the maximum correctable angle, in order to leave some room), which is according to the capability of the inclination corrector 37, is set as the second threshold.

When the inclination angle of a sheet P calculated does not exceed the second threshold, the inclination corrector 37 can correct the inclination of the sheet P such that the front edge K of the sheet P is parallel to the cross direction C, and consequently the sheet P can be properly cut on a peripheral line E of an image G along the four sides (edges) of the image G.

If the CPU 21 determines that the calculated inclination angle of the sheet P exceeds the second threshold (Step S47: YES), the CPU 21 performs control to eject the sheet P to the outside without cutting (Step S49), which is performed by the cutting device 30, because proper cutting for the sheet P cannot be performed.

If the CPU 21 determines that the calculated inclination angle of the sheet P does not exceed the second threshold (Step S47: NO), the CPU 21 ends the inclination determination process, and causes the inclination corrector 37 to perform the first round of the inclination correction operation (Step S9).

More specifically, the CPU 21 causes the rollers 371, 372, which form one pair, and the rollers 373, 374, which form the other pair, of the inclination corrector 37 to rotate having a difference in the rotation speed (i.e. in the number of rotations per unit time), namely rotate at different speeds, for the calculated inclination angle of the sheet P, and the sheet P rotates on the axis perpendicular to the surface of the sheet P, accordingly.

Next, the CPU 21 determines whether one of the optical sensors 421, 422 of the second detector 42 of the inclination detector 40 has detected the front edge K of the sheet P (Step S11).

The above determination is repeated until the front edge K of the sheet P is detected, and when the front edge K is detected, the CPU 21 starts to measure a time from the detection timing of the front edge K of the sheet P by the one of the two optical sensors 421, 422 to the detection timing thereof by the other of the two optical sensors 421, 422, from the difference (time difference) between the detection timings, calculates the inclination angle of the front edge K of the sheet P from the cross direction C (Step S13) (shown in FIG. 14).

That is, the inclination of the sheet P may not be cancelled by the first round of the inclination correction operation due to various factors exemplified by a processing error, an assembly error and wear of the rollers 371 to 374 of the inclination corrector 37 and thickness and material of the sheet P. Hence, the CPU 21 causes the inclination corrector 37 to perform the second round of the inclination correction operation on the basis of the remaining inclination of the sheet P (Step S15).

The CPU 21 may cause the inclination corrector 37 to perform the second round of the inclination correction operation on the basis of only the inclination angle based on the detection by the second detector 42, or may cause the inclination corrector 37 to perform the second round of the inclination correction operation on the basis of both the inclination angle based on the detection by the first detector 41 and the inclination angle based on the detection by the second detector 42.

This control will be described with reference to FIG. 21. As shown in FIG. 21, when the inclination angle of a sheet P based on the first round of the detection by the first detector 41 is 5°, in the first round of the inclination correction operation, the CPU 21 causes the rollers 371, 372, which form one pair, and the rollers 373, 374, which form the other pair, of the inclination corrector 37 to rotate with a difference in the number of rotations per unit time for correcting an inclination angle of 5° with reference to the table data to correct the inclination of the sheet P.

After the first round of the inclination correction operation, if the inclination angle of the sheet P based on the second round of the detection by the second detector 42 is 0.5°, it means that the first round of the inclination correction operation has actually corrected an inclination angle of 4.5° only.

That is, the inclination corrector 37 can actually correct an inclination angle of 4.5° for a targeted correction angle of 5°.

By taking this into account, for the second round of the inclination correction operation, the targeted correction angle is changed to 0.5°×5/4.5=0.56°. The CPU 21 then causes the rollers 371, 372, which form one pair, and the rollers 373, 374, which form the other pair, of the inclination corrector 37 to rotate with a difference in the number of rotations per unit time for correcting an inclination angle of 0.56° with reference to the table data to correct the inclination of the sheet P.

This actually corrects an inclination angle of (almost) 0.5°, so that the inclination angle of the sheet P can be corrected to be almost 0°.

Then, the CPU 21 ends the control on the inclination correction operation.

In Step S1, if the CPU 21 determines to obtain the inclination angle of the sheet P with the side-edge detector 36 (Step S1: NO), the CPU 21 determines whether the side-edge detector 36 has detected the side edge S of the sheet P (Step S17).

The above determination is repeated until the side edge S of the sheet P is detected, and when the side edge S is detected, the CPU 21 causes the side-edge detector 36 to continue to detect the side edge S of the sheet P over the measurement distance d as the first round of inclination detection (Step S19).

Then, from the change in the position of the side edge S over the measurement distance d, the CPU 21 calculates the inclination angle of the side edge S from the feed direction F (Step S21).

In this case too, the CPU 21 performs the inclination determination process shown in FIG. 18 on the calculated inclination angle (Step S23).

In the inclination determination process, if the CPU 21 determines that the calculated inclination angle of the sheet P exceeds neither the first threshold nor the second threshold (Step S41: NO, Step S47: NO), the CPU 21 causes the inclination corrector 37 to perform the first round of the inclination correction operation (Step S25).

In this case too, the inclination of the sheet P may not be cancelled by the first round of the inclination correction operation, which is performed by the inclination corrector 37. Hence, the CPU 21 causes the side-edge detector 36 to continue to detect the side edge S of the sheet P over the measurement distance d again as the second round of the inclination detection (Step S27).

Then, from the change in the position of the side edge S over the measurement distance d obtained by the second round of the inclination detection, the CPU 21 calculates the inclination angle of the side edge S from the feed direction F (Step S29).

Then, the CPU 21 causes the inclination corrector 37 to perform the second round of the inclination correction operation (Step S31).

In this case too, the CPU 21 may cause the inclination corrector 37 to perform the second round of the inclination correction operation on the basis of only the inclination angle based on the second round of the detection, or may cause the inclination corrector 37 to perform the second round of the inclination correction operation on the basis of both the inclination angle based on the first round of the detection and the inclination angle based on the second round of the detection.

In the latter case, the CPU 21 causes the inclination corrector 37 to perform the second round of the inclination correction operation in the same manner as in the case shown in FIG. 21.

This makes the side edge S of the sheet P parallel to the feed direction F.

In this state, the CPU 21 causes the side-edge detector 36 to detect the position of the side edge S of the sheet P in the cross direction C again (Step S33). This is for accurately detecting the position of the side edge S of the sheet P in the cross direction C in the state in which the side edge S of the sheet P is parallel to the feed direction F.

The detected position of the side edge S of the sheet P in the cross direction C is stored in the RAM 23 or the storage 24, and used, in the control on cutting of the sheet P in a set cutting mode, which is performed by the cutting device 30, to cut the sheet P along the feed direction F at a position(s) that is a predetermined distance away from the side edge S of the sheet P in the cross direction C.

Then, the CPU 21 ends the control on the inclination correction operation.

After ending the control on the inclination correction operation, the CPU 21 performs the control on cutting of the sheet P in a set cutting mode, thereby causing the cutting device 30 to cut the sheet P in the set cutting mode.

Technical Effects of First Embodiment

In the post-processing apparatus 20 of the image forming system 100 described above, the CPU 21 causes the cutting device 30 to cut a sheet P after causing the inclination corrector 37 to perform the inclination correction operation on the sheet P for the amount of inclination of the sheet P based on the detection by the inclination detector 40.

This can sufficiently reduce the inclination of the front edge K of a sheet P from the cross direction C. When the image forming apparatus 10 forms an image G on a sheet P with the front edge K of the sheet P as a reference, the post-processing apparatus 20 (cutting device 30) can cut the sheet P on a peripheral line E of the image G, and consequently can improve the quality of the product generated by the cutting. Further, the above can eliminate a need to provide the post-processing apparatus 20 with, for example, an image reader and also with an image data memory and an arithmetic processing element for analyzing images, and consequently can greatly reduce cost for the post-processing apparatus 20.

Further, in the post-processing apparatus 20, the CPU 21 causes the cutting device 30 to cut a sheet P after causing the inclination corrector 37 to perform the inclination correction operation on the sheet P for the amount of inclination of the sheet P based on the detection by the side-edge detector 36.

This can sufficiently reduce the inclination of the side edge S of a sheet P from the feed direction F. When the image forming apparatus 10 forms an image G on a sheet P with the side edge S of the sheet P as a reference, the post-processing apparatus 20 (cutting device 30) can cut the sheet P on a peripheral line E of the image G, and consequently can improve the quality of the product generated by the cutting. Further, in this case too, the above can greatly reduce cost for the post-processing apparatus 20.

Further, the CPU 21 chooses one detector between the inclination detector 40 and the side-edge detector 36, obtains the amount of inclination of a sheet P based on the detection by the chosen detector and causes the inclination corrector 37 to perform the inclination correction operation on the sheet P.

This makes it possible to correct the inclination of a sheet P both in the case where the image forming apparatus 10 forms an image on the sheet P with the front edge K of the sheet P as a reference and in the case where the image forming apparatus 10 forms an image on the sheet P with the side edge S of the sheet P as a reference.

In particular, the post-processing apparatus 20 includes the setting inputter 26. Hence, the user can make a choice between the inclination detector 40 and the side-edge detector 36 as appropriate.

Further, the post-processing apparatus 20 includes the communication I/F 28. Hence, the CPU 21 can choose one detector between the inclination detector 40 and the side-edge detector 36 based on information or a choosing command input from outside, for example, from the image forming apparatus 10. Thus, the post-processing apparatus 20 can cooperate with an external apparatus, such as the image forming apparatus 10, and choose a proper detector.

Further, the inclination detector 40 includes the first detector 41 and the second detector 42. Hence, the inclination detector 40 can perform the detection twice, one time at the first detection position L1 and the other time at the second detection position L2.

Further, with the two times/rounds of the detection above, the CUP 21 causes the inclination corrector 37 to perform the first round of the inclination correction operation based on the detection by the first detector 41 and perform the second round of the inclination correction operation based on the detection by the second detector 42. Hence, even when the first round of the inclination correction operation does not correct the inclination of a sheet P enough, the second round of the inclination correction operation can cancel the remaining inclination. This can more efficiently reduce the inclination of a sheet P.

Further, in the case where the side-edge detector 36 is used for detecting the inclination of a sheet P, the CPU 21 causes the side edge detractor 36 to perform the detection twice and causes the inclination corrector 37 to perform the inclination correction operation twice. Hence, in this case too, even when the first round of the inclination correction operation does not correct the inclination of a sheet P enough, the second round of the inclination correction operation can cancel the remaining inclination. This can more efficiently reduce the inclination of a sheet P.

Further, both in the case where the inclination detector 40 is used for detecting the inclination of a sheet P and in the case where the side-edge detector 36 is used for detecting the inclination of a sheet P, the CPU 21 causes the inclination corrector 37 to perform the first round of the inclination correction operation based on the first round of the detection and perform the second round of the inclination correction operation based on the first round and the second round of the detection.

This makes it possible to perform the second round of the inclination correction operation with a correction error generated in the first round of the inclination correction operation removed, and consequently can more efficiently reduce the inclination of a sheet P.

As described above, both in the case where the inclination detector 40 is used for detecting the inclination of a sheet P and in the case where the side-edge detector 36 is used for detecting the inclination of a sheet P, the CPU 21 may cause the inclination corrector 37 to perform the first round of the inclination correction operation based on the first round of the detection and perform the second round of the inclination correction operation based on the second round of the detection. This has an advantage in simplifying processing while efficiently reducing the inclination of a sheet P.

Further, in the post-processing apparatus 20, the side-edge detector 36, the inclination corrector 37 and the inclination detector 40 are arranged in the inclination correction section R in this order from the upstream side in the feed direction F. This arrangement makes it possible to use the inclination corrector 37 in both the case where the side-edge detector 36 is used for detecting the inclination of a sheet P and in the case where the inclination detector 40 is used for detecting the inclination of a sheet P, and consequently can simplify the configuration of the post-processing apparatus 20 and miniaturize the post-processing apparatus 20, for example.

Further, the CPU 21 obtains the amount of inclination of a sheet P based on the position of the side edge S of the sheet P, the position keeping being detected by the side-edge detector 36 while the sheet P is being conveyed a predetermined distance (measurement distance d). This can eliminate a need to detect the position of the side edge S over the entire length of a sheet P, and consequently can miniaturize the post-processing apparatus 20 in the feed direction F.

In particular, the measurement distance d can be input as appropriate through the setting inputter 26. Setting the measurement distance d to a shorter value within a proper range can further miniaturize the post-processing apparatus 20.

Further, the CPU 21 causes the side-edge detector 36 to detect the position of the side edge S of a sheet P after the inclination correction operation on the sheet P, and then causes the cutting device 30 to cut the sheet P along the feed direction F.

Thus, the position of the side edge S of a sheet P is detected with the side edge S parallel to the feed direction F. This makes it possible to obtain the position of the side edge S of a sheet P with higher accuracy and cut the sheet P along the feed direction F at a highly accurate position(s) in the cross direction C.

Further, a line sensor is used as the side-edge detector 36. Hence, the side-edge detector 36 can detect the position of the side edge S of a sheet P with high accuracy according to its resolution.

Further, the CPU 21 causes the cutting device 30 not to cut a sheet P in response to the amount of inclination of the sheet P exceeding the second threshold as a predetermined upper limit. This can reduce generation of a poor product, which is generated when a sheet P inclining more than the maximum correctable angle of the inclination corrector 37 is cut on a line deviating from a peripheral line E of an image G formed thereon.

Further, the CPU 21 causes the inclination corrector 37 not to perform the inclination correction operation on a sheet P in response to the amount of inclination of the sheet P exceeding the first threshold as a predetermined upper limit. This can prevent the conveyance path from being clogged with a sheet P.

Further, the inclination corrector 37 is a rotational corrector that rotates a sheet P with a difference in the amount of rotation between two pairs of rollers 371 to 374 aligned along the cross direction C. This can realize a configuration that can easily correct the orientation of a sheet P in a narrow space.

Second Embodiment

Next, a second embodiment according to the present disclosure will be described. In the second embodiment, an inclination corrector 37A different from the inclination corrector 37 in configuration is used. The inclination corrector 37A is applicable to the post-processing apparatus 20 by being placed in the same area (inclination correction section R) as the inclination corrector 37.

Figure 23:
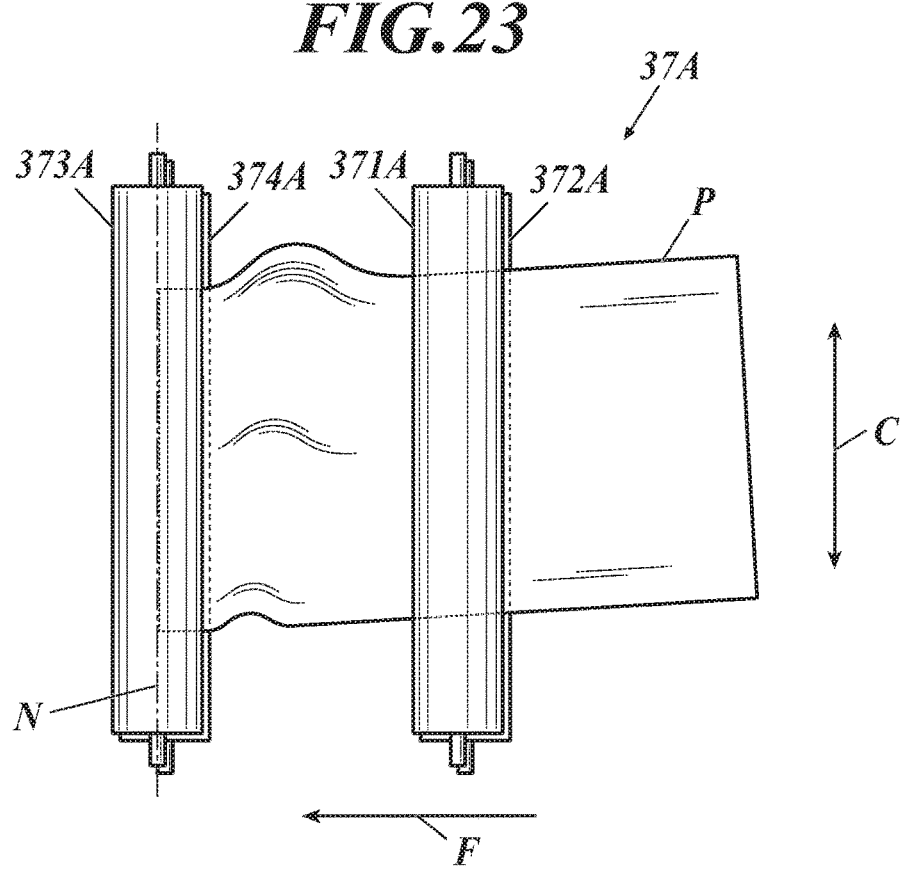
FIG. 23 is a plan view of the inclination corrector according to the second embodiment.

FIG. 22 and FIG. 23 are a side view and a plan view of the inclination corrector 37A, respectively.

As shown in FIG. 22 and FIG. 23, the inclination corrector 37A includes a pair of rollers 371A, 372A on the upstream side and a pair of rollers 373A, 374A on the downstream side in the feed direction F. The rollers 371A, 372A are disposed so as to hold a sheet P, which has been conveyed thereto and is to be conveyed therefrom, from the front side and the back side thereof. The same applies to the rollers 373A, 374A.

The CPU 21 as the controller can separately control a motor as a drive source for the pair of rollers 371A, 372A and a motor as a drive source for the pair of rollers 373A, 374A.

The pair of rollers 371A, 372A on the upstream side are provided with an actuator (not shown) for separating the rollers 371A, 372A from one another (and making the rollers 371A, 372A close together). The CPU 21 can control the actuator too.

The CPU 21 controls the motors and the actuator to cause the inclination corrector 37A to perform the inclination correction operation of correcting the inclination of a sheet P by the rollers 371A, 372A on the upstream side: (i) conveying the sheet P until the front edge (leading edge in the feed direction F) of the sheet P hits a nip portion N of the stopped rollers 373A, 374A on the downstream side; (ii) after the rollers 373A, 374A on the downstream side start to convey the sheet P, separating from one another, thereby once releasing the sheet P; and then (iii) closing together again to restart to convey the sheet P.

The pair of rollers 371A, 372A on the upstream side and the pair of rollers 373A, 374A on the downstream side are both arranged such that their rotation axes are parallel to the cross direction C. Hence, the nip portion N of the pair of rollers 373A, 374A on the downstream side is parallel to the cross direction C.

When the pair of rollers 371A, 372A on the upstream side convey an inclined sheet P such that the front edge K of the sheet P hits the nip portion N of the pair of rollers 373A, 374A on the downstream side, the sheet P bends with different degrees on the far side and the near side in the cross direction C, and the front edge K becomes parallel to the cross direction C by hitting the nip portion N.

When the pair of rollers 373A, 374A on the downstream side start to convey the sheet P in this state, the sheet P is conveyed with the front edge K parallel to the cross direction C. Even when the pair of rollers 373A, 374A on the downstream side start to convey the sheet P in a state in which the front edge K has not entirely reached the nip portion N, the front edge K enters the nip portion N by the sheet P being conveyed, so that the sheet P is conveyed with the front edge K parallel to the cross direction C.

When the rollers 371A, 372A on the upstream side separate from one another in this state, thereby releasing the sheet P, the front edge K maintains parallel to the cross direction C, and bending of the sheet P is eliminated.

Hence, it is possible to restart to convey the sheet P, the front edge K of which has been corrected to be parallel to the cross direction C.

It is not essential that the rollers 371A, 372A on the upstream side separate from one another, thereby releasing the sheet P. Even when the sheet P is conveyed without being released, the sheet P can be conveyed with the front edge K parallel to the cross direction C. Hence, although it is preferable that the inclination corrector 37A have the actuator for separating the rollers 371A, 372A on the upstream side, the actuator is not an essential component.

When the inclination corrector 37A is applied to the post-processing apparatus 20 by being placed in the same area as the inclination corrector 37, the inclination corrector 37A can obtain the same effects as the inclination corrector 37, and also can correct the inclination of a sheet P such that the front edge K of the sheet P becomes parallel to the cross direction C, without the inclination detector 40.

Third Embodiment

Next, a third embodiment according to the present disclosure will be described. In the third embodiment, an inclination corrector 37B different from the inclination corrector 37 in configuration is used. The inclination corrector 37B is applicable to the post-processing apparatus 20 by being placed in the same area (inclination correction section R) as the inclination corrector 37.

Figure 24:
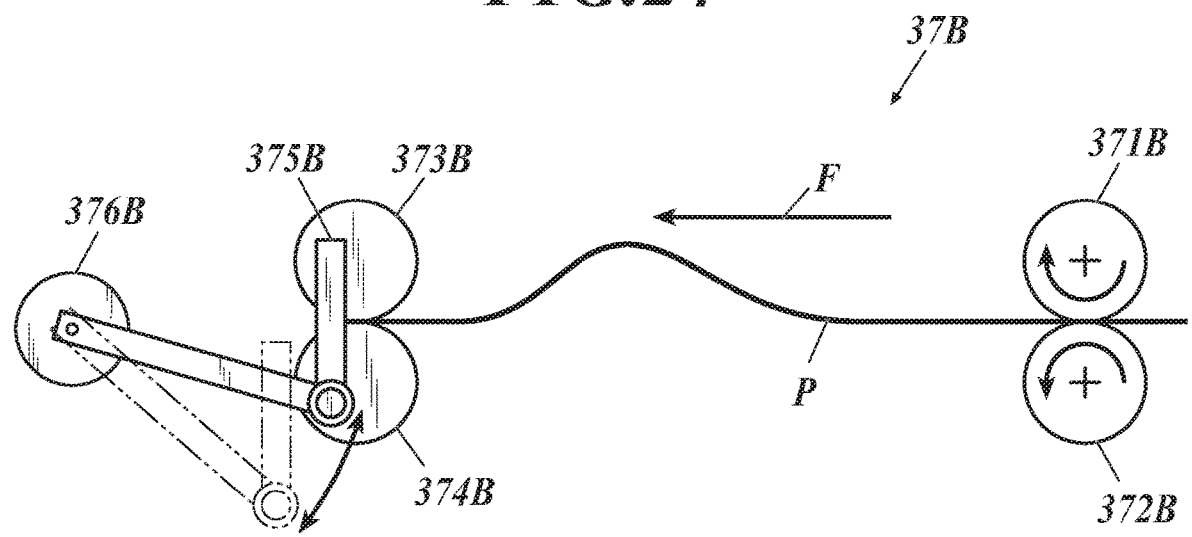
FIG. 24 is a side view of an inclination corrector according to a third embodiment of the present disclosure.
Figure 25:
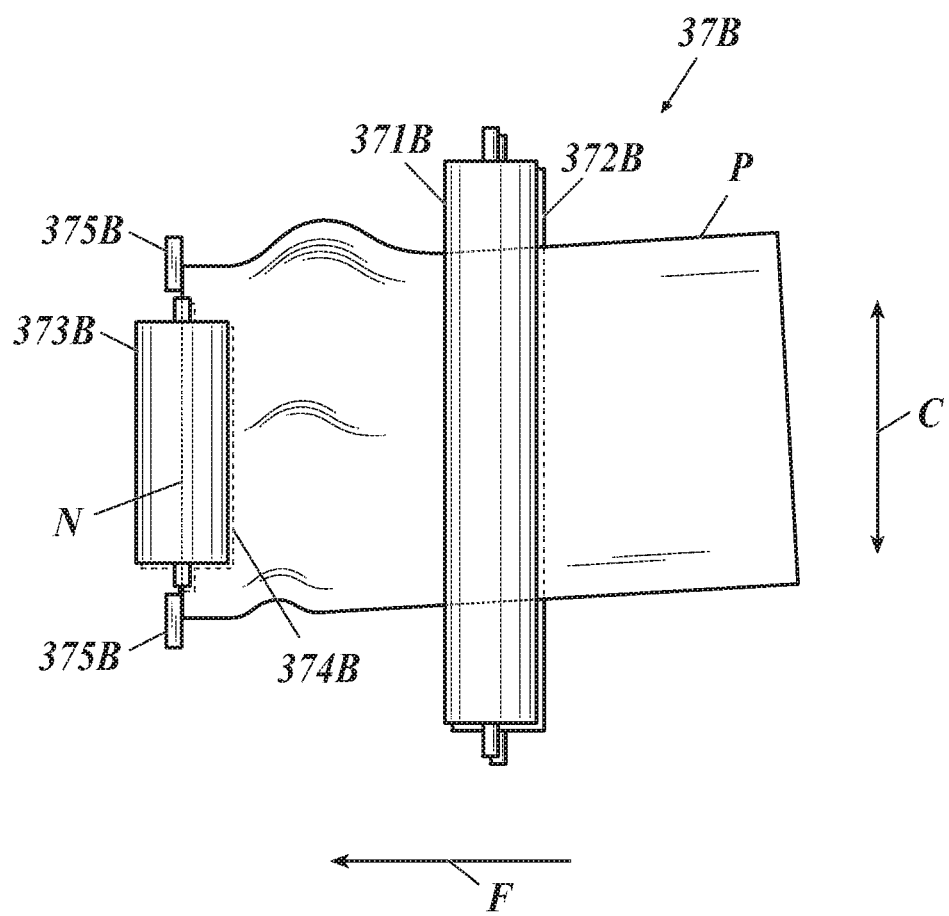
FIG. 25 is a plan view of the inclination corrector according to the third embodiment.

FIG. 24 and FIG. 25 are a side view and a plan view of the inclination corrector 37B, respectively.

As shown in FIG. 24 and FIG. 25, the inclination corrector 37B includes a pair of rollers 371B, 372B on the upstream side in the feed direction F, a pair of rollers 373B, 374B on the downstream side in the feed direction F, shutter(s) 375B that block and unblock the conveyance path (D1), which is formed, for example, by the rollers 371B to 374B, and a driver(s) 376B that drives the shutters 375B to block and unblock the conveyance path.

The rollers 371B, 372B are disposed so as to hold a sheet P, which has been conveyed thereto and is to be conveyed therefrom, from the front side and the back side thereof. The same applies to the rollers 373B, 374B.

The CPU 21 as the controller can separately control a motor as a drive source for the pair of rollers 371B, 372B and a motor as a drive source for the pair of rollers 373B, 374B.

The pair of rollers 371B, 372B on the upstream side are provided with an actuator (not shown) for separating the rollers 371B, 372B from one another (and making the rollers 371B, 372B close together). The CPU 21 can control the actuator too.

The shutters 375B have contact surface(s) that are perpendicular to the feed direction F and parallel to the cross direction C and that the front edge K of the sheet P hits (contacts). The contact surfaces of the shutters 375B are arranged, on the conveyance path, at a plane where the nip portion N of the pair of rollers 373B, 374B on the downstream side parallel to the cross direction C is located, or somewhat upstream of the plane in the feed direction F.

The driver 376B for the shutters 375B is, for example, a motor or an actuator, such as a solenoid, for moving the shutters 375B so as to be off and on the conveyance path. The CPU 21 controls operation of the driver 376B.

The CPU 21 controls the motors, the actuator and the driver 376B to cause the inclination corrector 37B to perform the inclination correction operation of correcting the inclination of a sheet P by: (i) the shutters 375B being on the conveyance path with the rollers 373B, 374B on the downstream side stopped; (ii) in this state, the rollers 371B, 372B on the upstream side conveying the sheet P until the front edge (leading edge in the feed direction F) of the sheet P hits the contact surfaces of the shutters 375B, and then separating from one another, thereby once releasing the sheet P; (iii) the shutters 375B being off the conveyance path; and (iv) the rollers 371B, 372B on the upstream side closing together again to (re)start to convey the sheet P together with the rollers 373B, 374B on the downstream side.

The pair of rollers 371B, 372B on the upstream side and the pair of rollers 373B, 374B on the downstream side are both arranged such that their rotation axes are parallel to the cross direction C.

Because the contact surfaces of the shutters 375B are arranged to be parallel to the cross direction C, when the pair of rollers 371B, 372B on the upstream side convey an inclined sheet P such that the front edge K of the sheet P hits the contact surfaces, the sheet P bends with different degrees on the far side and the near side in the cross direction C, and the front edge K becomes parallel to the cross direction C by hitting the contact surfaces.

When the rollers 371B, 372B on the upstream side separate from one another in this state, thereby releasing the sheet P, the front edge K maintains parallel to the cross direction C, and bending of the sheet P is eliminated.

Hence, it is possible to restart to convey the sheet P, the front edge K of which has been corrected to be parallel to the cross direction C, when evacuating the shutters 375B from the conveyance path.

When the inclination corrector 37B is applied to the post-processing apparatus 20 by being placed in the same area as the inclination corrector 37, the inclination corrector 37B can obtain the same effects as the inclination corrector 37, and also can correct the inclination of a sheet P such that the front edge K of the sheet P becomes parallel to the cross direction C, without the inclination detector 40.

[Others]

The above embodiments are merely examples of the post-processing apparatus or the image forming system of the present disclosure, and hence not intended to limit the present invention. The detailed configuration and detailed operation of each component of the post-processing apparatus or the image forming system can also be appropriately modified without departing from the scope of the present invention.

For example, although the post-processing apparatus 20 in the above embodiments includes the side-edge detector 36 and the inclination detector 40, it may include only one of these.

Further, for example, although paper sheets are used as sheets P in the above embodiments, the material of sheets P is not limited to paper. Hence, sheets P may be resin sheets or the like.

Although one or more embodiments of the present invention have been described and illustrated in detail, the disclosed embodiments are made for purposes of not limitation but illustration and example only. The scope of the present invention should be interpreted by terms of the appended claims.

What is claimed is:

1. A post-processing apparatus comprising:
    a cutting device that cuts a sheet along one or both of a feed direction in which the sheet is conveyed and a cross direction perpendicular to the feed direction;
    one or both of an inclination detector that detects a front edge of the sheet in the feed direction at multiple positions in the cross direction and a side-edge detector that detects a position of a side edge of the sheet in the cross direction;
    an inclination corrector that performs an inclination correction operation of correcting an inclination of the sheet; and
    a hardware processor that causes the cutting device to cut the sheet after causing the inclination corrector to perform the inclination correction operation on the sheet for an amount of the inclination of the sheet based on the detection by the inclination detector or the detection by the side-edge detector,
wherein the post-processing apparatus comprises the inclination detector and the side-edge detector, and
wherein the hardware processor chooses one detector between the inclination detector and the side-edge detector, obtains the amount of the inclination of the sheet based on the detection by the chosen detector and causes the inclination corrector to perform the inclination correction operation on the sheet.

2. The post-processing apparatus according to claim 1, further comprising a choice inputter for a user to make a choice between the inclination detector and the side-edge detector,
wherein the hardware processor chooses the one detector between the inclination detector and the side-edge detector based on the choice input through the choice inputter, and obtains the amount of the inclination of the sheet based on the detection by the chosen detector.

3. The post-processing apparatus according to claim 1, further comprising a communication unit to which information or a choosing command for choosing one of the inclination detector and the side-edge detector is input from outside,
wherein the hardware processor chooses the one detector between the inclination detector and the side-edge detector based on the information or the choosing command input to the communication unit, and obtains the amount of the inclination of the sheet based on the detection by the chosen detector.

4. An image forming system comprising:
an image forming apparatus that forms an image on a sheet; and
the post-processing apparatus according to claim 1.

5. A post-processing apparatus comprising:
a cutting device that cuts a sheet along one or both of a feed direction in which the sheet is conveyed and a cross direction perpendicular to the feed direction;
one or both of an inclination detector that detects a front edge of the sheet in the feed direction at multiple positions in the cross direction and a side-edge detector that detects a position of a side edge of the sheet in the cross direction;
an inclination corrector that performs an inclination correction operation of correcting an inclination of the sheet; and
a hardware processor that causes the cutting device to cut the sheet after causing the inclination corrector to perform the inclination correction operation on the sheet for an amount of the inclination of the sheet based on the detection by the inclination detector or the detection by the side-edge detector,
wherein the post-processing apparatus comprises the side-edge detector, and
wherein the hardware processor causes the side-edge detector to detect the position of the side edge of the sheet twice and causes the inclination corrector to perform the inclination correction operation on the sheet twice.

6. The post-processing apparatus according to claim 5, wherein the hardware processor causes the inclination corrector to perform a first round of the inclination correction operation based on a first round of the detection by the side-edge detector and perform a second round of the inclination correction operation based on a second round of the detection by the side-edge detector.

7. The post-processing apparatus according to claim 5, wherein the hardware processor causes the inclination corrector to perform a first round of the inclination correction operation based on a first round of the detection by the side-edge detector and perform a second round of the inclination correction operation based on the first round and a second round of the detection by the side-edge detector.

8. An image forming system comprising:
an image forming apparatus that forms an image on a sheet; and
the post-processing apparatus according to claim 5.

9. A post-processing apparatus comprising:
a cutting device that cuts a sheet along one or both of a feed direction in which the sheet is conveyed and a cross direction perpendicular to the feed direction;
one or both of an inclination detector that detects a front edge of the sheet in the feed direction at multiple positions in the cross direction and a side-edge detector that detects a position of a side edge of the sheet in the cross direction;
an inclination corrector that performs an inclination correction operation of correcting an inclination of the sheet; and
a hardware processor that causes the cutting device to cut the sheet after causing the inclination corrector to perform the inclination correction operation on the sheet for an amount of the inclination of the sheet based on the detection by the inclination detector or the detection by the side-edge detector,
wherein the post-processing apparatus comprises the side-edge detector,
wherein the cutting device cuts the sheet along the feed direction at a position that is a predetermined distance away from the side edge of the sheet in the cross direction, and
wherein the hardware processor causes the side-edge detector to detect the position of the side edge of the sheet after the inclination correction operation on the sheet, and causes the cutting device to cut the sheet along the feed direction.

10. An image forming system comprising:
an image forming apparatus that forms an image on a sheet; and
the post-processing apparatus according to claim 9.

11. A post-processing apparatus comprising:
a cutting device that cuts a sheet along one or both of a feed direction in which the sheet is conveyed and a cross direction perpendicular to the feed direction;
one or both of an inclination detector that detects a front edge of the sheet in the feed direction at multiple positions in the cross direction and a side-edge detector that detects a position of a side edge of the sheet in the cross direction;
an inclination corrector that performs an inclination correction operation of correcting an inclination of the sheet; and
a hardware processor that causes the cutting device to cut the sheet after causing the inclination corrector to perform the inclination correction operation on the sheet for an amount of the inclination of the sheet based on the detection by the inclination detector or the detection by the side-edge detector,
wherein the hardware processor causes the cutting device not to cut the sheet in response to the amount of the inclination of the sheet exceeding a predetermined upper limit.

12. An image forming system comprising:
an image forming apparatus that forms an image on a sheet; and
the post-processing apparatus according to claim 11.

\* \* \* \* \*